United States Patent [19]
Shima

[11] Patent Number: 6,084,589
[45] Date of Patent: Jul. 4, 2000

[54] INFORMATION RETRIEVAL APPARATUS

[75] Inventor: Mitsuhide Shima, Tokyo, Japan

[73] Assignee: Mitsubishi Denki Kabushiki Kaisha, Tokyo, Japan

[21] Appl. No.: 08/852,527

[22] Filed: May 7, 1997

[30] Foreign Application Priority Data

Oct. 30, 1996 [JP] Japan ................................... 8-287980

[51] Int. Cl.⁷ .................................................... G06F 9/455
[52] U.S. Cl. ............................................................. 345/419
[58] Field of Search ..................... 345/418, 419, 345/420, 428, 429, 433

[56] References Cited

U.S. PATENT DOCUMENTS

| | | | |
|---|---|---|---|
| 5,682,505 | 10/1997 | Usami et al. ............................. | 345/418 |
| 5,727,138 | 3/1998 | Harada ..................................... | 345/419 |
| 5,751,289 | 5/1998 | Myers ....................................... | 345/419 |
| 5,751,612 | 5/1998 | Donovan et al. ........................ | 345/419 |
| 5,751,931 | 5/1998 | Cox et al. ................................. | 345/419 |

OTHER PUBLICATIONS

Special Report "VRML for creating VR spaces on the Internet" in "Nikkei Computer Graphics (Nov. 1995)" pp. 96–113.

Primary Examiner—Cliff N. Vo

[57] ABSTRACT

In order to obtain an information retrieval apparatus for performing retrieval from an anchor to be set with respect to a virtual three dimensional space, and to enable retrieval over a wide retrieval range through an easy-to-use user interface, a movement anchor generator unit is provided to generate a movement anchor corresponding to a change in viewpoint information. A three dimensional space generator unit generates not only ordinary objects, but also objects representing movement anchors in three dimensional images. A user selects a virtual object, which is a movement anchor, on an image. Linked data regarding the movement anchor is registered in a linked data storage unit. A retrieval unit can perform retrieval, not only with ordinary objects as anchors, but also through the movement anchor. Any application program execution unit for processing the display of a retrieval result can be used, and a wide range of linked information can be handled.

8 Claims, 18 Drawing Sheets

INFORMATION RETRIEVAL APPARATUS

BACKGROUND OF THE INVENTION

1. Field of the Invention

This invention relates to an information retrieval apparatus for retrieving information linked from an anchor specified in a virtual three dimensional space.

2. Description of the Related Art

Conventional information retrieval apparatuses are available, such as WebSpace, a VRML (Virtual Reality Modeling Language) browser that was described on pages 96 to 113 in the November 1995 issue of Nikkei Computer Graphics. This apparatus constructs a virtual three dimensional space in a computer, places a virtual object therein, and displays the virtual three dimensional space on a display screen. When an operator moves a cursor on the display screen using a pointing device such as a mouse and specifies a virtual object on the screen, the apparatus retrieves linked information, such as a homepage on the Internet, that has been linked to the virtual object.

FIG. 15 is a basic functional block diagram of a conventional information retrieval apparatus for performing retrieval in a virtual space. In the figure, a viewpoint position modifier unit 2, which is a pointing device, such as a joystick, outputs a coordinate data signal. This coordinate data signal is, for example, an electric signal representing the amount of displacement.

A viewpoint position set unit 4 includes a function for transforming the coordinate data signal from viewpoint position modifier unit 2 into a form that can be used by an image generator unit 6. In other words, viewpoint position set unit 4 performs, with respect to the coordinate data signal that was output from viewpoint position modifier unit 2, a transformation to three dimensional coordinate data in an orthogonal coordinate system to determine a viewpoint position and line of sight direction. The viewpoint position and line of sight direction together is called hereinafter a "viewpoint vector". A viewpoint vector is output to image generator unit 6. Image generator unit 6 generates an image when a virtual three dimensional space defined by three dimensional data 8 is viewed from a viewpoint position defined by a viewpoint vector obtained from viewpoint position set unit 4 in a line of sight direction defined by the same viewpoint vector.

A cursor position modifier unit 10 is, for example, a pointing device, such as a mouse. An anchor specifier unit 12 is, for example, a mouse button. An anchor information set unit 14 generates a two dimensional coordinate representing a cursor position on the screen based on a coordinate data signal of a cursor that is input through cursor position modifier unit 10, and displays the cursor at that position on the screen. On the other hand, anchor information set unit 14 obtains a coordinate on the screen of a virtual object to be an anchor from image generator unit 6. Thus, when the cursor is moved onto the virtual object which is to be the anchor through cursor position modifier unit 10, and the virtual object is specified through an operation of anchor specifier unit 12, such as a click of a mouse button, anchor information set unit 14 can judge that the virtual object has been selected. If the virtual object that was selected through anchor specifier unit 12 has been defined as an anchor, anchor information set unit 14 outputs data specifying the virtual object, such as an object ID, to a linked information retrieval unit 16. Linked information retrieval unit 16 retrieves and displays linked information 20, such as a home page on the Internet, based on linked data 18 that was mapped to the virtual object, which is an anchor. An image display unit 22 displays images, for example, for display by the aforementioned image generator unit 6 and the aforementioned linked information retrieval unit 16.

The aforementioned viewpoint position set unit 4, anchor information set unit 14, image generator unit 6, and linked information retrieval unit 16 may, in concrete terms be, for example, central processing units (CPU) in computers executing their respective prescribed programs. Furthermore, three dimensional data 8 is usually stored in a storage device in a computer and used by being read as necessary.

FIG. 16a is a schematic diagram showing a virtual three dimensional space and a viewpoint vector. FIG. 16b is a schematic diagram showing an image that image generator unit 6 generates corresponding to the viewpoint vector shown in FIG. 16a. FIG. 16a shows an example where object A (an object 30) and object B (an object 32) having identical sizes are arranged in a three dimensional space. The coordinate system corresponds to a cathode ray tube surface (CRT surface) of the display device, and is hereinafter referred to as a CRT coordinate system. For example, the x-axis corresponds to a vertical direction of the screen, the y-axis a horizontal direction, and the z-axis a direction of depth. Since the line of sight and the screen oppose each other, the direction of a line of sight vector having a viewpoint position 34 as the origin in this coordinate system becomes parallel with the z-axis. FIG. 16b is a two dimensional image of objects A and B when viewed from viewpoint 34 in the z-axis direction. The term "two dimensional image" is used herein to mean a "two dimensional type" of image, namely, an image represented in a plane without perspective. Therefore, in FIG. 16b, objects A and B are represented as images 38, 40 having identical sizes on a screen 36, even though these objects have different distances from viewpoint 34.

FIG. 17a and FIG. 17b are schematic diagrams illustrating examples of operations of cursor position modifier unit 10 and anchor specifier unit 12, respectively. When an operator moves a mouse 50, which is cursor position modifier unit 10, such as back and forth or left and right on a table surface, a cursor 52 accordingly moves up and down or left and right on screen 36 (FIG. 17a). After the operator manipulates mouse 50 to move cursor 52 over image 38 of object A and clicks, for example, a left mouse button 54, which is anchor specifier unit 12, anchor information set unit 14 compares the coordinate on screen of virtual object A obtained from image generator unit 6 and the coordinate specified by the cursor, then judges that the relevant object was specified (FIG. 17b).

Linked information retrieval unit 16 retrieves information linked to a homepage on the Internet, for example, with an object in a three dimensional space specified through anchor information set unit 14 as an anchor and based on a link that was mapped to the anchor beforehand. FIG. 18 is a schematic diagram showing an operation for retrieving linked information that was linked to an object in a three dimensional space specified through anchor information set unit 14. For example, anchor information set unit 14 fetches an object ID attached to image 38 of an object specified through anchor specifier unit 12, and passes it to linked information retrieval unit 16. Then, linked information retrieval unit 16 retrieves linked information 20 corresponding to the object ID from linked data 18. Linked information retrieval unit 16 is, in general, an HTML (Hyper Text Markup Language) browser capable of processing and displaying HTML files described in HTML.

Linked data 18 represents information mapping an object ID and a URL address which indicates a storage location on the Internet, and is described within an HTML file. Linked information 20 is an HTML file, such as an HTML file for a home page on a server connected to the Internet.

Operations to modify a viewpoint position in the aforementioned virtual three dimensional space are implemented by a VRML file and a VRML browser, which processes and displays VRML files. The VRML browser is a helper application or plug-in software for the HTML browser and is used while installed into the HTML browser. The HTML browser decodes HTML files, and if they contain VRML files, entrusts the processing of the VRML files to the VRML browser.

In other words, linked information retrieval unit 16 fetches a URL address 55 corresponding to the object ID from linked data 18 and accesses an HTML file 57 on a server connected to a network 56. HTML file 57 is passed to the HTML browser in linked information retrieval unit 16. A VRML file in the HTML file is passed to the VRML browser through the HTML interface, transformed to image data 58, and displayed on image display unit 22.

In the aforementioned conventional information retrieval apparatus, other functions in addition to the operations for the aforementioned three dimensional space can be implemented by installing into the HTML browser applications providing the respective functions.

However, in the aforementioned conventional information retrieval apparatus, it is necessary to interface the application to be installed with the HTML browser. Furthermore, the data to be handled by the various functions is included within the HTML file, namely, it must appear to be an HTML file. Due to this constraint, considerable effort is required to integrate the various types of existing applications in an information retrieval apparatus using conventional hypermedia technology and a problem is that this cannot be easily implemented, while another problem is that the retrievable information range also becomes limited.

In the conventional information retrieval apparatus, only a virtual object in a virtual space could be specified as an anchor, while else could not be specified as an anchor.

In the conventional information retrieval apparatus, a user could specify display states, one at a time or all at once, whether or not to identifiably indicate that virtual objects are anchors. However, the user could not switch a display state according to some condition or state.

Furthermore, in the aforementioned conventional retrieval apparatus, since a cursor indicating a virtual object in a virtual space moves only on a specific plane, a problem is that the cursor may become hidden behind the virtual object when the virtual three dimensional space is displayed in three dimensions.

One method to solve this problem in the conventional apparatus is by performing an operation to move the viewpoint behind the virtual object in the foreground. However, a problem with this method is that the operation is troublesome.

Furthermore, another method to solve the aforementioned problem is by covering the screen displaying the virtual three dimensional space in three dimensions with the plane for moving the cursor, namely, by moving the cursor on a plane always positioned in front of the virtual three dimensional space. However, a problem with this method is that the display loses its three dimensional perspective.

SUMMARY OF THE INVENTION

This invention intends to solve the aforementioned problems. The first object is to provide a three dimensional space manipulation type of information retrieval apparatus having an excellent user interface with enhanced reality and the capability of easily handling data for various applications.

The information retrieval apparatus related to in this invention for achieving this object is characterized by having:

multiple types of application program execution units for generating information display images according to their respective input information;

a linked information storage unit for storing linked information to be input information for one of the application program execution units;

a linked data storage unit for storing linked data that maps linked information and an anchor, which is a link node;

a viewpoint manipulation unit for manipulating a viewpoint vector in a virtual three dimensional space;

a three dimensional space generator unit for generating a three dimensional image giving a three dimensional perspective and which is an image in virtual three dimensional space based on the viewpoint vector;

an anchor determining unit for specifying on the three dimensional image, the anchor defined by a virtual object within the virtual three dimensional space;

a retrieval unit for retrieving linked information corresponding to the aforementioned specified anchor based on the linked data, and supplying it to the corresponding application program execution unit; and an image display unit for displaying on a three dimensional image an information display image generated by the application program execution unit.

According to this invention, multiple types of application program execution units are provided, and linked information, which becomes input information for these application program execution units, are registered in the linked information storage unit. When an anchor on the three dimensional image is specified through the anchor determining unit, the retrieval unit references the linked information storage unit based on the linked data registered in the linked data storage unit and passes the fetched linked information to the corresponding application program execution unit. This configuration frees the application program execution units from constraints of the interface with the retrieval unit. It thus becomes easy to integrate various application program execution units into the apparatus and the variety of linked information to be retrieved can be expanded. Furthermore, the three dimensional manipulation user interface provides the user with an integrated retrieval service allowing an expanded information range to be easily referenced.

The second object of this invention is to provide an information retrieval apparatus having a simple interface with improved operability allowing operations in the viewpoint and line of sight directions within the virtual three dimensional space and operations for specifying an anchor, which is a node of the retrieved data on the screen, to be performed on a single input device.

The information retrieval apparatus related to in this invention for achieving this object is characterized by having a set function unit, a set modifier unit, and a function determining unit instead of the aforementioned viewpoint manipulation unit and the aforementioned anchor determining unit. The set function unit provides a viewpoint position set function for setting a viewpoint vector to the aforementioned three dimensional space generator unit, and an anchor information set function for specifying a virtual object, which is an object within the virtual three dimensional space and mapped to the anchor, and fetching information for the relevant anchor from the relevant virtual object. The set modifier unit sends modification data for the viewpoint vector or coordinate data representing the anchor's positional data to the set function unit. The function determining unit selects whether to use the coordinate data, which is input from the set modifier unit, as an input for either the aforementioned viewpoint position set function or the aforementioned anchor information set function.

According to this invention, the function determining unit selects a subject for operation by the set modifier unit for either the viewpoint position set function or the anchor information set function. Therefore, operations for the viewpoint and line of sight directions within the virtual three dimensional space and operations for specifying an anchor, which is a node of the retrieved data on the screen, can be performed on a single input means, or the set modifier unit. Therefore, a simple user interface is achieved, allowing improved operability of the information retrieval apparatus.

The third object is to provide an information retrieval apparatus featuring a wide variety of anchors that can be specified in a virtual three dimensional space and capable of diverse information retrieval operations.

The information retrieval apparatus related to in this invention for achieving this object is characterized by having:

a significance attribute specifier unit for specifying a virtual object within a virtual three dimensional space on a three dimensional image and outputting a significance attribute mapped to the relevant virtual object;

a significant set data storage unit for storing an attribute data set having the significance attribute as an element, and a significant set data which defines significance information to be linked to the attribute data set; and a retrieval unit for finding significance information corresponding to the significance attribute that was output from the significance attribute specifier unit based on the significant set data, retrieving linked information based on the linked data with the significance information as the anchor, and supplying the relevant linked information that was retrieved to the corresponding application program execution unit.

According to this invention, the virtual object is furnished with a significance attribute having a significance. The significant set data storage unit registers a link between a set of significance attributes and significance information regarding this set. Thus, if one object among the virtual objects belonging to the same significance attribute is specified, its significance information can be set as an anchor. In other words, objects other than those in the virtual three dimensional space can be specified as anchors, so that the versatility of the information retrieval method increases thereby improving the user interface.

Furthermore, the information retrieval apparatus related to in this invention for providing other anchor types includes:

a movement anchor generator unit for generating, with modification information for the viewpoint vector through the viewpoint manipulation unit as an anchor, data for a virtual object that is to be mapped to this anchor;

a three dimensional space generator unit for generating a three dimensional image of a virtual three dimensional space including the virtual object; and an anchor determining unit for specifying in the three dimensional image the anchor that was defined by the virtual object.

According to this invention, a modification of the viewpoint vector through the viewpoint manipulation unit is generated as a movement anchor, and this movement anchor is displayed on the three dimensional image as a virtual object. In other words, a manipulation of the viewpoint vector with respect to the virtual three dimensional space can be specified as an anchor, so that the versatility of the information retrieval method increases, thereby improving the user interface.

The fourth object is to provide an information retrieval apparatus that facilitates the identification of anchors displayed in a virtual three dimensional space.

The information retrieval apparatus related to in this invention for achieving this object is characterized by having an anchor display condition set unit for setting an anchor display condition corresponding to the viewpoint vector to the three dimensional space generator unit, wherein the three dimensional space generator unit includes an anchor identification display unit for selecting a display state of the virtual object representing the relevant anchor, depending on whether or not the anchor meets the anchor display condition.

According to this invention, the display condition for the virtual object, which is an anchor, can be set according to an operation, such as modification of the viewpoint vector.

The anchor identification display unit displays the virtual object, which is an anchor, on the three dimensional image in accordance with the display condition that was set. This configuration enables only anchors of a minimum requirement as specified through the anchor display condition set unit to be displayed so as to be identifiable. Thus, in comparison to conventional display methods where all anchors are displayed at once so as to be identifiable or not identifiable, the three dimensional image becomes easy to see and the concerned anchor can be quickly found, allowing an easy-to-use user interface to be provided.

The fifth object is to provide an information retrieval apparatus that makes a cursor displayed on a three dimensional image easy to see and easy to use.

The information retrieval apparatus related to in this invention for achieving this object is characterized by having in the anchor determining unit:

a cursor position modifier unit for specifying coordinate data of a cursor indicating an anchor;

a cursor position on movement plane determining unit for transforming the coordinate data into a cursor generation position on a cursor movement plane provided in a three dimensional space;

a cursor hiding detector unit for detecting the hiding state of a cursor positioned behind a virtual object when the cursor generation position on the cursor movement plane is on a three dimensional image;

a front-of-object cursor position determining unit for modifying, in a hiding state, the cursor generation position to a position in front of the relevant virtual object; and an anchor information set unit for displaying the cursor on an image display unit based on the cursor generation position determined through the cursor position on movement plane determining unit or the front-of-object cursor position determining unit.

According to this invention, it is judged whether or not the cursor on the cursor movement plane will be hidden by the virtual object. If it will be hidden, the generated position of the cursor is changed to a position in front of the relevant virtual object and then displayed. It therefore becomes possible to avoid having the cursor hidden by the virtual object and to provide an easy-to-use user interface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The embodiments of this invention are described below with reference to the drawings.

First Embodiment

Figure 1:
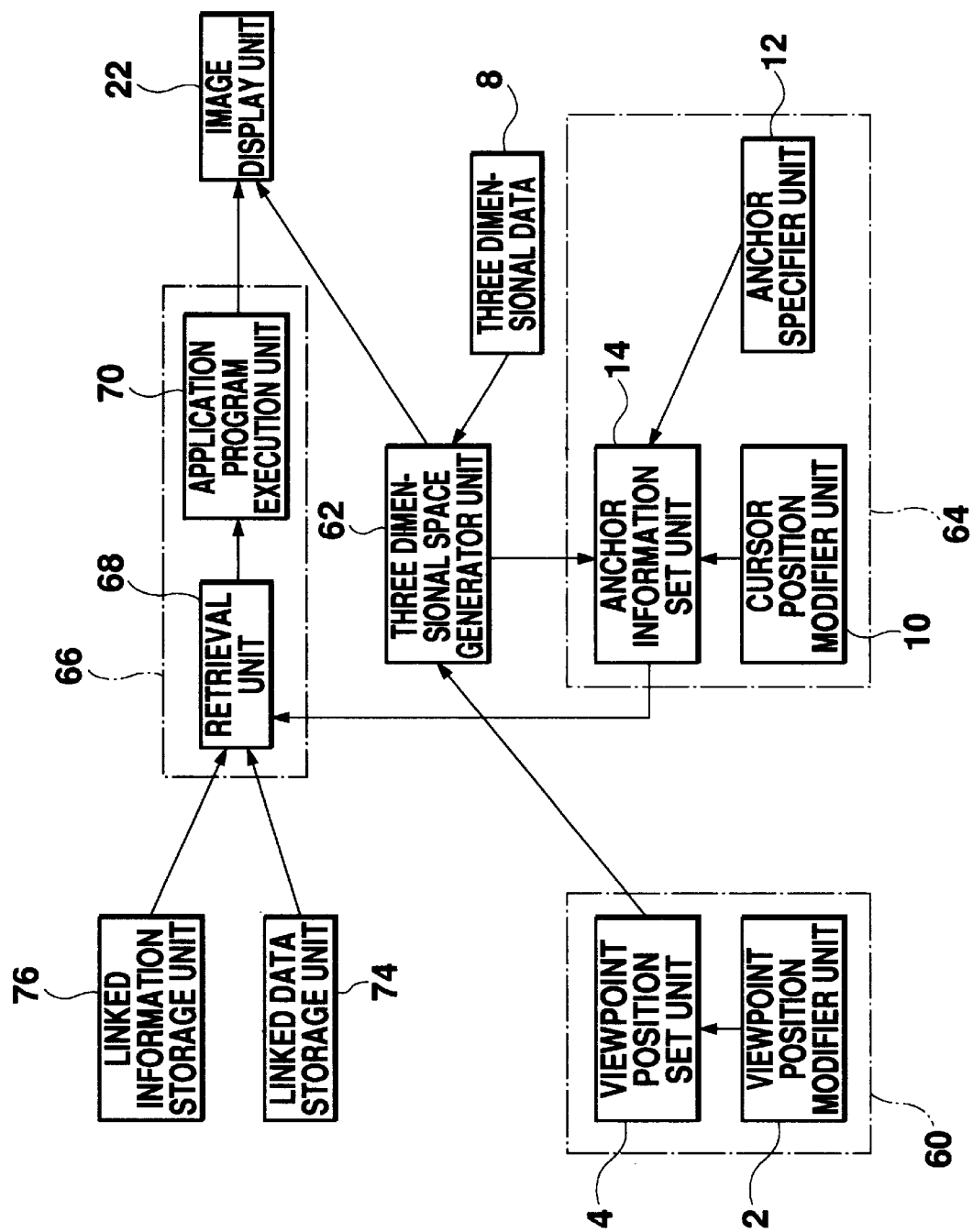
FIG. 1: Basic functional block diagram of an information retrieval apparatus for performing retrieval in a virtual space according to a first embodiment of this invention.

FIG. 1 is a basic functional block diagram of an information retrieval apparatus for performing retrieval in a virtual space according to a first embodiment of this invention. This apparatus is configured using a computer having an arithmetic unit, storage device, and I/O device. First, each functional block will be described with reference to FIG. 1.

In FIG. 1, a viewpoint manipulation unit 60 includes viewpoint position modifier unit 2 and viewpoint position set unit 4. Viewpoint position modifier unit 2 is a pointing device, such as a joystick or trackball, and outputs a coordinate data signal. This coordinate data signal is, for example, an electric signal representing the amount of a pointer's displacement.

Viewpoint position set unit 4 transforms the coordinate data signal from viewpoint position modifier unit 2 into information representing a viewpoint position and line of sight direction in a virtual three dimensional space constructed in this apparatus. Hereinafter, a combination of the viewpoint position and line of sight direction is called a viewpoint vector.

Three dimensional data 8 includes such information as an identifier (ID), shape, color, and arrangement of a virtual object within a virtual three dimensional space; the type of light source, whether point or collimated; and its arrangement. Three dimensional data 8 is usually stored in a storage device in a computer and used by being read as necessary.

A three dimensional space generator unit 62 constructs a virtual three dimensional space, which is a three dimensional space defined by three dimensional data 8, viewed in a line of sight direction from a viewpoint defined by a viewpoint vector. At this time, three dimensional space generator unit 62 performs a perspective transformation to produce a perspective view, and a shading process to render a three dimensional appearance to objects.

Naturally, a parallel projection may be used instead of the perspective projection, and a wire-frame display may be used instead of shading. The coordinate system for the virtual three dimensional space based on the viewpoint vector is usually an orthogonal coordinate system where one coordinate axis is set for each of the vertical and horizontal directions on the surface of the cathode ray tube (CRT) for a display device composing image display unit 22, and the final coordinate axis is set in the direction of depth. This coordinate system is herein called a CRT coordinate system.

Three dimensional space generator unit 62 generates image data representing a three dimensional space as viewed according to the viewpoint vector and supplies the arrangement of an object in the CRT coordinate system and additional information for the object to another module. The perspective transformation and the shading process provide a three dimensional image to render a three dimensional appearance through differences in the viewed sizes of an object depending on distance and shadows depending on the incident light.

An anchor determining unit 64 is a block having functions to display a cursor on the three dimensional image displayed on image display unit 22 and to use the cursor to point to a virtual object displayed in the image, and includes cursor position modifier unit 10, anchor specifier 12, and anchor information set unit 14.

Cursor position modifier unit 10 is, for example, a pointing device such as a mouse. Anchor specifier unit 12 is, for example, a mouse button. Anchor information set unit 14 sets a cursor movement plane parallel to a screen within the virtual three dimensional space. Furthermore, anchor information set unit 14 transforms a cursor coordinate data signal that is input from cursor position modifier unit 10 into a two dimensional coordinate corresponding to the cursor movement plane, and displays the cursor at the coordinate position. Anchor information set unit 14 obtains coordinates in the CRT coordinate system for the virtual object, which is to be an anchor, from three dimensional space generator unit 62. Thus, when the cursor moves through cursor position modifier unit 10 onto the virtual object that is to be the anchor and the virtual object is specified through anchor specifier unit 12, anchor information set unit 14 can judge that the virtual object was selected. Anchor information set unit 14 fetches data specifying the selected virtual object, such as an object ID, from information that is supplied from three dimensional space generator unit 62.

A linked information processing unit 66 includes a retrieval unit 68 and an application program execution unit 70. Retrieval unit 68 obtains an object ID from anchor information set unit 14, and retrieves linked information that is linked to a virtual object, which is an anchor. Application program execution unit 70 is shown in the figure as only a single unit although in practice a multiple number of units may exist, which would comprise a group of modules for executing application programs to provide mutually differing services, such as document editing, spreadsheet processing, animation display processing, and audio synthesis processing, and for generating information image display data to display the respective retrieved linked information as a processing result.

A linked data storage unit 74 is a storage device, such as a magnetic disk drive, which stores linked data defining links between anchors and linked information. A linked information storage unit 76 is a storage device, such as a magnetic disk drive, which stores linked information. The aforementioned viewpoint position set unit 4, anchor information set unit 14, three dimensional space generator 62, retrieval unit 68, and application program execution unit 70 are, for example, in concrete terms, central processing units (CPU) in computers for executing their respective prescribed programs.

An operation of the apparatus is described next. When a viewpoint vector in a virtual three dimensional space on a computer is specified through viewpoint position modifier unit 2, a coordinate data signal is passed from viewpoint position modifier unit 2 to viewpoint position set unit 4. Viewpoint set unit 4 transforms this into a viewpoint vector and sets it to three dimensional space generator unit 62. Three dimensional space generator unit 62 generates a virtual three dimensional space based on the viewpoint vector and three dimensional data 8. The three dimensional image generated by three dimensional space generator 62 is output to image display unit 22. On the other hand, the coordinates of the virtual object obtained from calculation by three dimensional space generator unit 62 and an attribute of the relevant object are supplied to anchor information set unit 14. Anchor information set unit 14 displays a cursor on image display unit 22, as well as selects a virtual object to be an anchor on the three dimensional image, and activates a retrieval process in linked information processing unit 66.

Figure 2A:
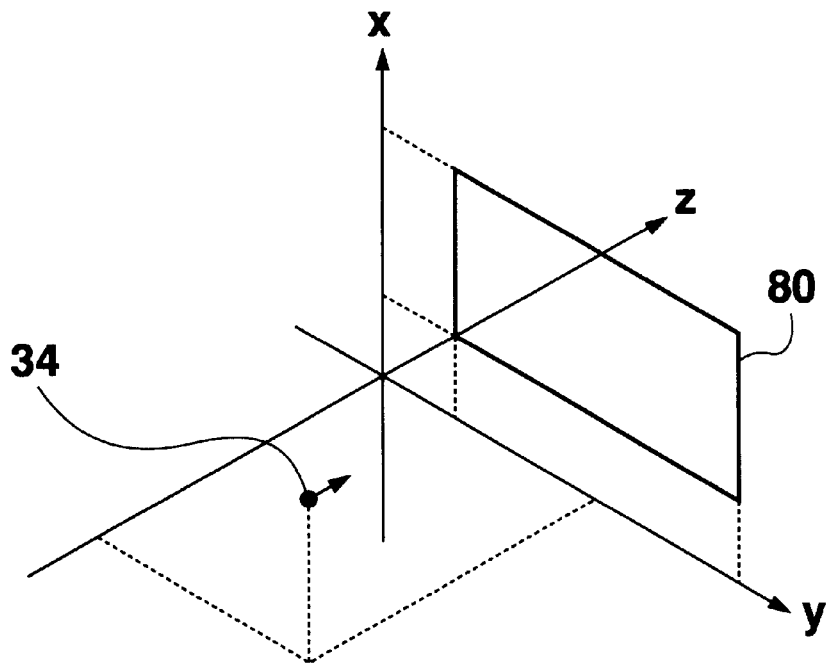
FIG. 2a and 2b: Schematic diagrams illustrating respective operations of an anchor determining unit according to the first embodiment of this invention.
Figure 2B:
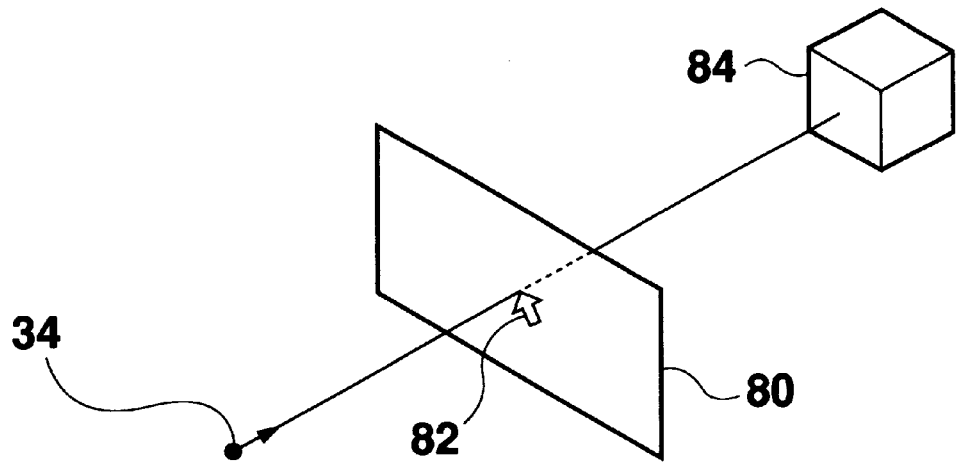

FIG. 2a and FIG. 2b are schematic diagrams illustrating operations of anchor determining unit 64 that includes anchor information set unit 14 as a compositional element. FIG. 2a is a schematic diagram showing a positional relationship between a viewpoint vector and a cursor movement plane 80, which anchor information set unit 14 sets to a virtual three dimensional space. The coordinate system referred to herein is a CRT coordinate system, for example, where the x-axis corresponds to the vertical direction of the screen, the y-axis to the horizontal direction, and the z-axis to the direction of depth. Cursor movement plane 80 is set parallel to the screen. Since the line of sight and the screen oppose each other, the direction of a line of sight vector having its origin at viewpoint position 34 is parallel with the z-axis and perpendicular to the cursor movement plane in this coordinate system.

FIG. 2b is a schematic diagram illustrating a method of indication for a virtual object in anchor determining unit 64. In this figure, the line of sight faces a virtual object 84. As a mouse, which is cursor position modifier unit 10, is moved back and forth and left and right on a table, a cursor 82 that is displayed on the cursor movement plane moves up, down, left and right. To select or indicate virtual object 84, the user must first move cursor 82 to a position overlapping virtual object 84 on the screen. In this case, since virtual object 84 lies along a line of sight direction, cursor 82 must be moved to a vicinity of the point of intersection of a line connecting viewpoint 34 and virtual object 84, which is an extension line of a viewpoint vector, with cursor movement plane 80. Then, when the left button of the mouse, for example, which is anchor specifier unit 12, is clicked, anchor information set unit 14 collates the x and y coordinates of virtual object 84 obtained from three dimensional space generator unit 62 with the x and y coordinates specified by cursor 82, and judges that the relevant object was specified so that virtual object 84 is selected. If multiple virtual objects exist along the direction of the screen's depth from the position of cursor 82, an object closest to cursor 82, namely, closest to cursor movement plane 80, positioned oppositely from viewpoint position 34 with respect to cursor movement plane 80 is selected.

Figure 3:
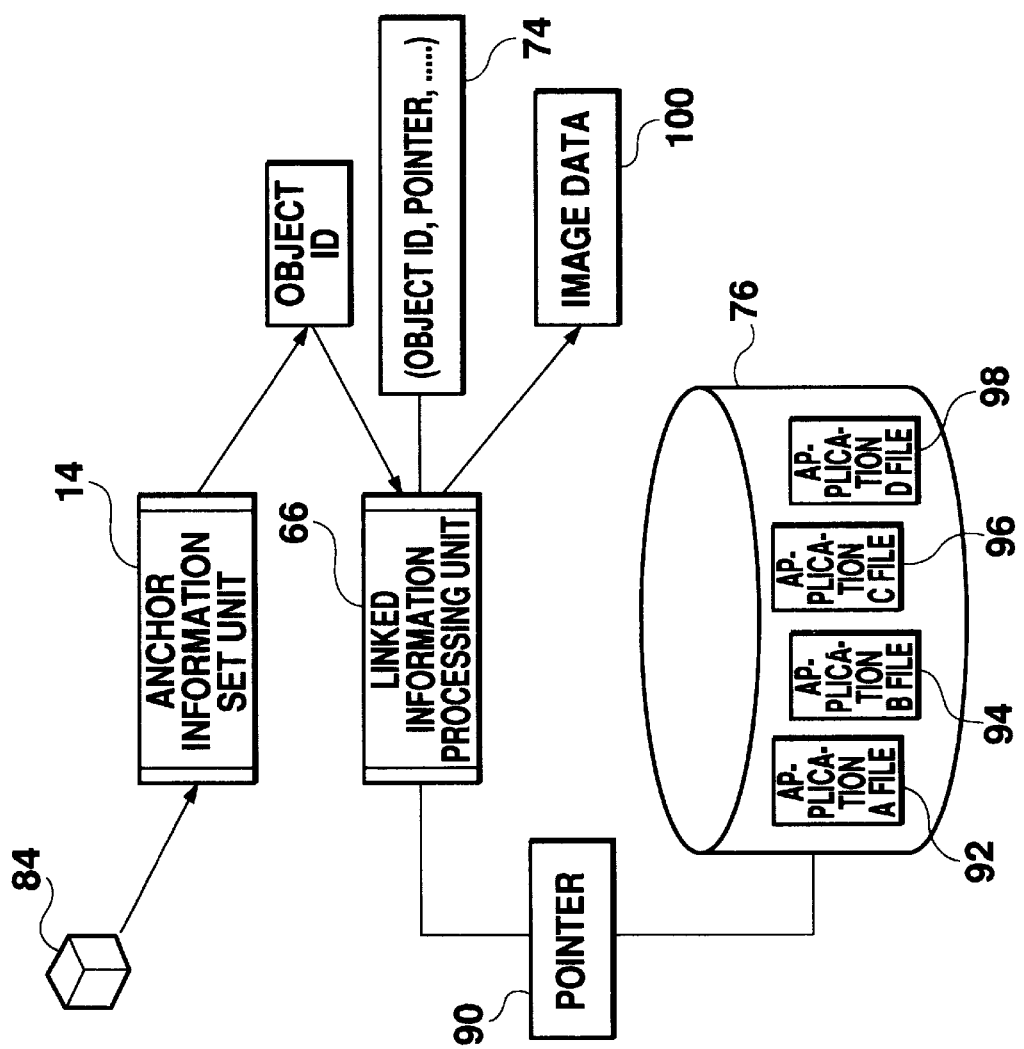
FIG. 3: Schematic diagram showing an example of an operation for retrieving linked information from a virtual object specified through anchor information set unit in the first embodiment of this invention.

FIG. 3 is a schematic diagram showing an example of an operation for retrieving linked information from a virtual object in a virtual three dimensional space specified through anchor information set unit 14. Anchor information set unit 14 fetches an object ID attached to virtual object 84 that was selected in the description of FIG. 2b from information supplied from three dimensional space generator unit 62 and passes the object ID to linked information processing unit 66. Then, at linked information processing unit 66, retrieval unit 68 references linked data storage unit 74 with the object ID as a key and fetches the corresponding linked data. Linked data represents a combination of the object ID and a pointer to a file of linked information corresponding to the object ID.

Retrieval unit 68 references linked information storage unit 76 using a pointer 90 obtained from the linked data.

Linked information storage unit 76 stores data files 92 to 98 for various application program execution units 70 installed in the apparatus. Retrieval unit 68 fetches a data file specified by pointer 90 from linked information storage unit 76. If multiple pointers have been specified for the linked data, the corresponding multiple data files are fetched from linked information storage unit 76.

It is assumed herein, for example, that data file 94 for application B, which corresponds to pointer 90, is fetched as linked information. At linked information processing unit 66, retrieval unit 68 judges that the fetched linked information is a data file for application B and passes the relevant data file 94 to application program execution unit 70 that executes application B. Application program execution unit 70 that executes application B, processes data file 94 and generates information display image data representing text and image information, for example. Information display image data 100 is output from linked information processing unit 66 to image display unit 22.

Image display unit 22 displays on a display device the three dimensional image from three dimensional space generator unit 62, the information display image from linked information processing unit 66, and the cursor image from anchor information set unit 14.

Figure 4:
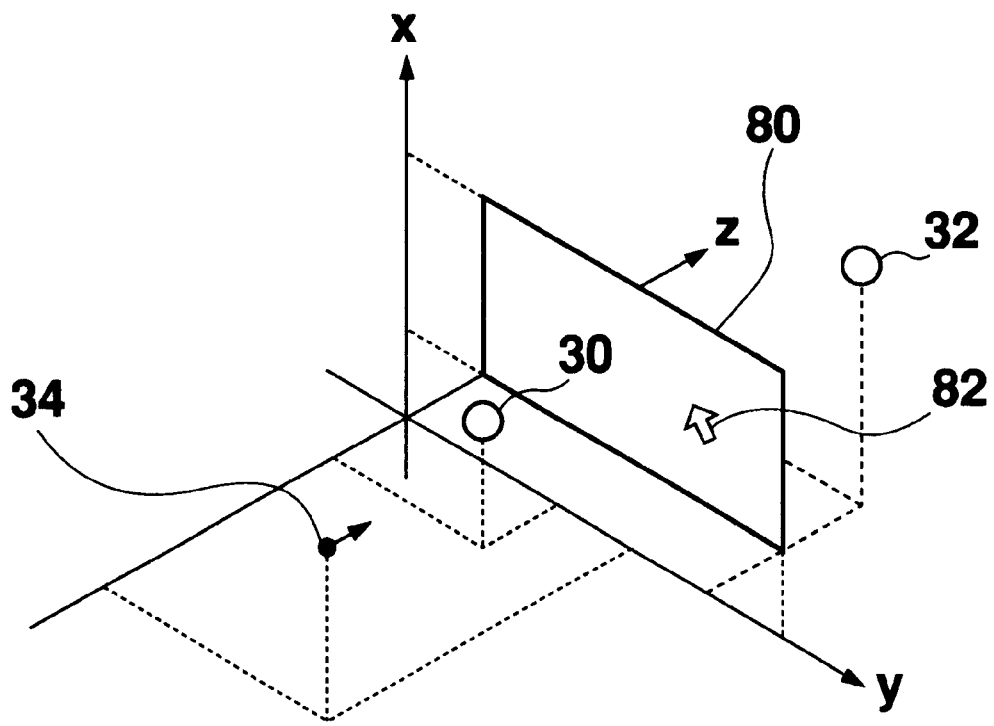
FIG. 4: Schematic diagram showing an example of a virtual three dimensional space in the first embodiment of this invention.

FIG. 4 is a schematic diagram showing an example of a virtual three dimensional space. In this example, object 30 and object 32, both having identical sizes, are respectively arranged with respect to cursor movement plane 80 on the viewpoint position side and on the opposite side. The CRT coordinate system is shown.

Figure 5A:
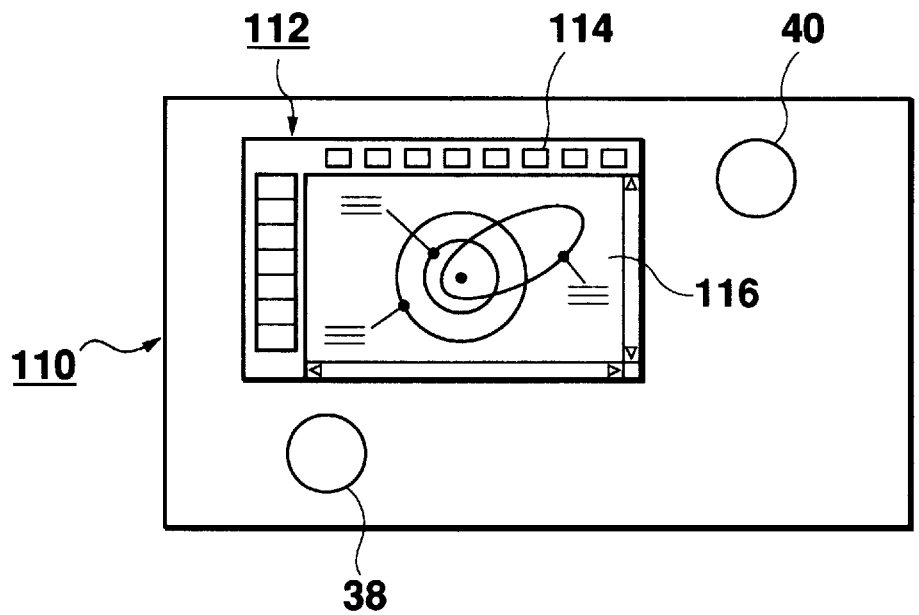
FIG. 5a and 5b: Schematic diagrams showing examples of an information display image displaying three dimensional images.
Figure 5B:
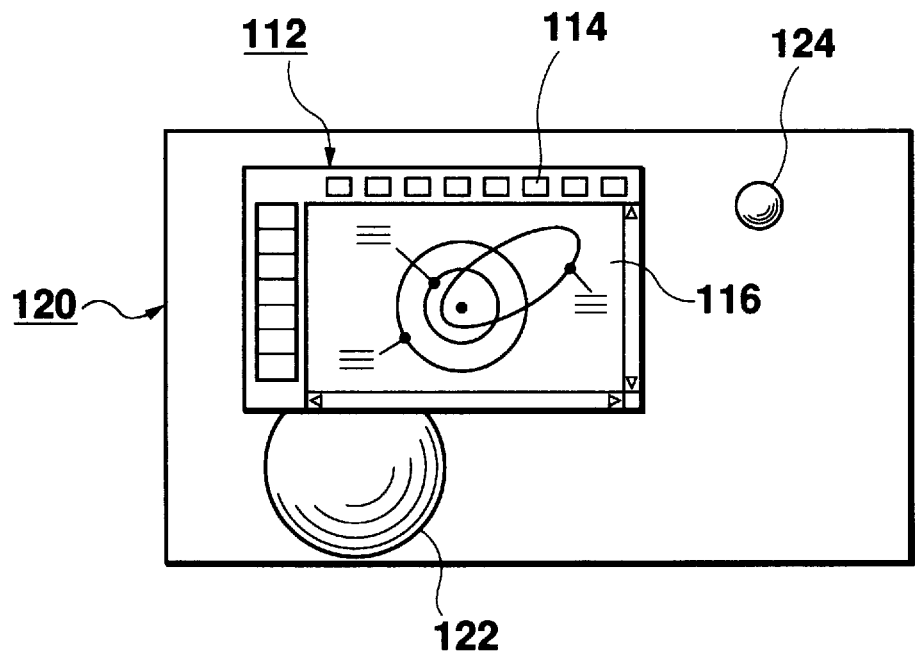

FIG. 5a and FIG. 5b are schematic diagrams showing example displays of an information display image on a three dimensional image in the virtual three dimensional space shown in FIG. 4. A screen 110 shown in FIG. 5a displays an information display image 112 overlapped on the three dimensional image without parallel projection or shading. Information display image 112 displays linked information retrieved, for example, by clicking an image of virtual object 40 with the cursor. The screen, for example, is arranged with icons 114 supplied by a tool, such as a paintbrush tool, along the screen's periphery, wherein a substantial information image 116 is displayed. Manipulating icons 114 enable information display image 112 to be enlarged or deleted. As shown in this figure, if the three dimensional image is generated according to the aforementioned condition, such as parallel projection, a flat image in which the three dimensional perspective is suppressed can be obtained. In contrast, FIG. 5b shows a display of the information display image overlapped on the three dimensional image generated according to a condition of perspective projection with shading so that an image 122 of virtual object 30 positioned in the front is displayed larger than an image 124 of virtual object 32 positioned in the back. This sort of processing is performed in three dimensional space generator unit 62.

The linked information that retrieval unit 68 of this apparatus retrieved is an input data file for the application program to be executed by application program execution unit 70, and retrieval unit 68 basically fetches this and passes it to the relevant application. In other words, retrieval unit 68 need not perform any special interface processing between the linked information and the application program to be executed by application program execution unit 70. This means that there are no constraints regarding application programs that can be installed as application program execution units 70 so that various types of information can be registered in linked information storage unit 76. In other words, this apparatus includes an excellent three dimensional space manipulation type of user interface and can provide an easy-to-use, integrated retrieval service to the user.

With an object in an information display image generated from an application program execution unit "A" as anchor "a", for example, this apparatus can also retrieve data file "b" for another application program execution unit "B", and display the information display image further in a three dimensional image. To achieve this, linked data, which comprises anchor "a" and a pointer indicating data file "b", must be registered in linked data storage unit 74.

Second Embodiment

Figure 6:
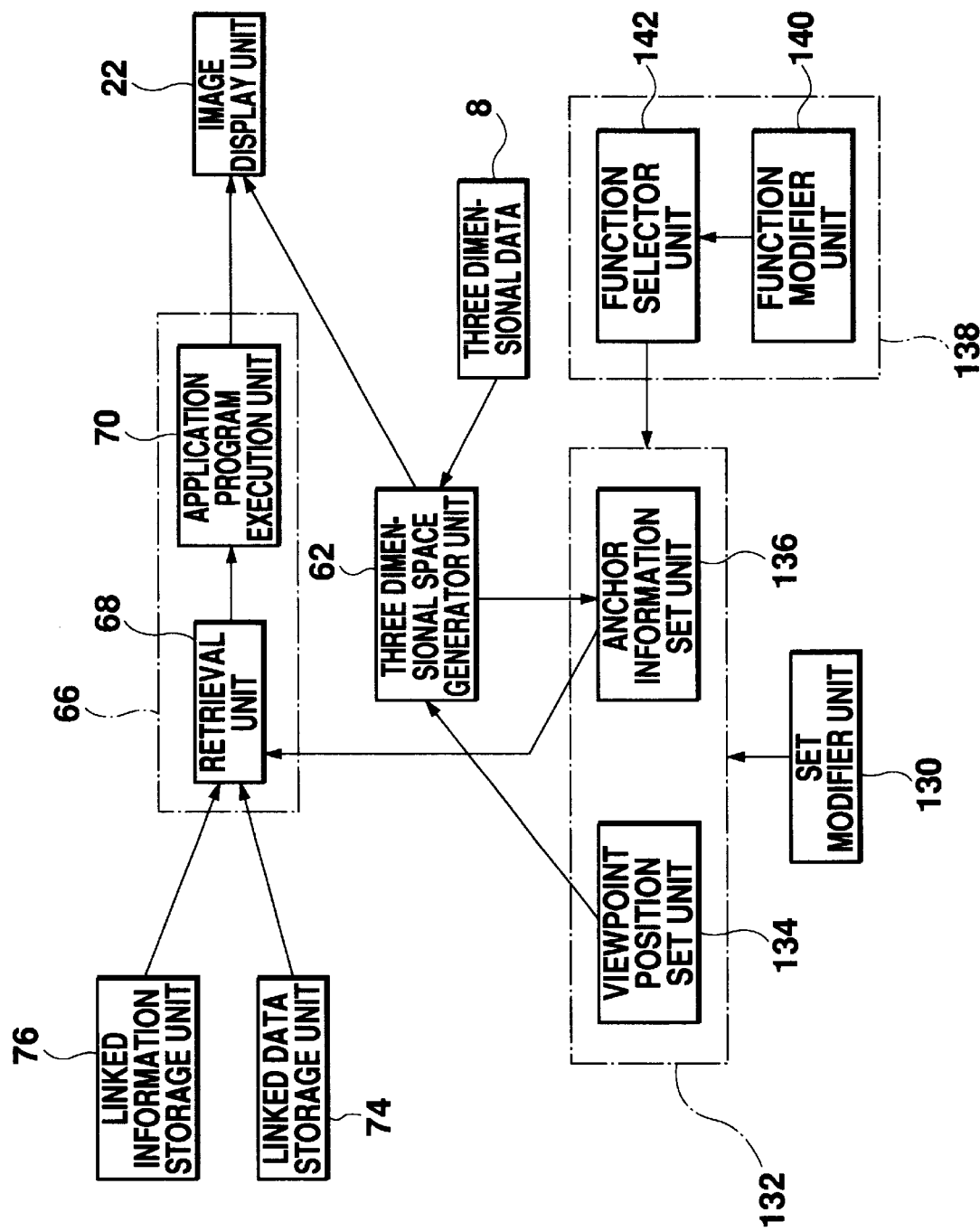
FIG. 6: Basic functional block diagram of an information retrieval apparatus for performing retrieval in a virtual space according to a second embodiment of this invention.

The first embodiment employed mutually differing means to move the cursor on the screen, such as with a mouse, and to modify the viewpoint vector, such as with a joystick. A second embodiment to be described below further simplifies the operation of the information retrieval apparatus having a three dimensional space manipulation type of user interface. FIG. 6 is a basic functional block diagram of an information retrieval apparatus, which is the second embodiment of this invention, for performing retrieval in a virtual space. In this embodiment, compositional elements having identical or equivalent functions with those in the aforementioned embodiment will be given the same reference numerals and their description will be omitted. A functional configuration of this apparatus will be described with reference to FIG. 6.

A set function unit 132 is an input means to a computer, such as a mouse, and includes a functional combination of viewpoint position modifier unit 2, cursor position modifier unit 10, and anchor specifier unit 12 of the first embodiment. Set function unit 132 is a computer module including a viewpoint position set unit 134, which has a function of viewpoint position set unit 4 of the first embodiment, and an anchor information set unit 136, which has a function of anchor information set unit 14 also of the first embodiment. A function determining unit 138 includes a function modifier unit 140 and a function selector unit 142. Function modifier unit 140 is a means for performing command inputs to the computer, possibly a keyboard, mouse button, or on-screen icon. Function selector unit 142 is a computer module for selecting which function of the two aforementioned set units 134 and 136, which are included in set function unit 132, is to be used.

An operation is described next. If, for example, a keyboard is used for function modifier unit 140, an operator pressing different keys assigned to the keyboard, for example, specifies a switching of the function of set function unit 132. Also possible is a configuration where the operator clicking the left and right mouse buttons, for example, or selecting on-screen icons or menus specifies a switching of the function of set function unit 132.

Function selector unit 142 receives a switching signal that is output from function modifier unit 140 and executes a functional selection of set function unit 132. This switching operation is performed, for example, by activating a program switch within set function unit 132 and switching to supply data from set modifier unit 130 to either viewpoint position set unit 134 or anchor information set unit 136. The mouse used herein as set modifier unit 130 is moved on a table and outputs coordinate data according to the direction and distance of its movement. The coordinate data is input by set function unit 132 and is used by a module specified by the aforementioned switching operation, which is either viewpoint position set unit 134 or anchor information set unit 136. When the coordinate data is input by viewpoint position set unit 134, it is used as data specifying a viewpoint vector. On the other hand, when this data is input by anchor information set unit 136, it is used as data specifying a cursor position on screen. If, for example, anchor information set unit 136 has been functionally selected, a signal from a click of a mouse button is used as a signal selecting a virtual object, which is an anchor linked to retrieval information. The operations of viewpoint position set unit 134 and anchor information set unit 136 after they receive input from set modifier unit 130 are identical to those of viewpoint position set unit 4 and anchor information set unit 14, respectively, and their description will be omitted.

An example of a method for function determining unit 138 to select a function of set function unit 132 is to use two different keys on a keyboard as function modifier units 140 and mapping these keys respectively to the two functions. In this case, an operator presses one of the keys and a corresponding function is selected. As another example, a prescribed common key is used as function modifier unit 140. In this case, each time the operator presses the single key, a function is selected alternately. Furthermore, as already mentioned, function modifier unit 140 may be mouse buttons or on-screen icons or menus. As an example, if function modifier unit 140 comprises mouse buttons, a click of the left button and a click of the right button may be functionally separated, or each click of the right button may alternately select functions. As another example, if on-screen icons or menus are used as function modifier unit 140, the operator would move a cursor with the mouse to select them to select functions.

Third Embodiment

Figure 7:
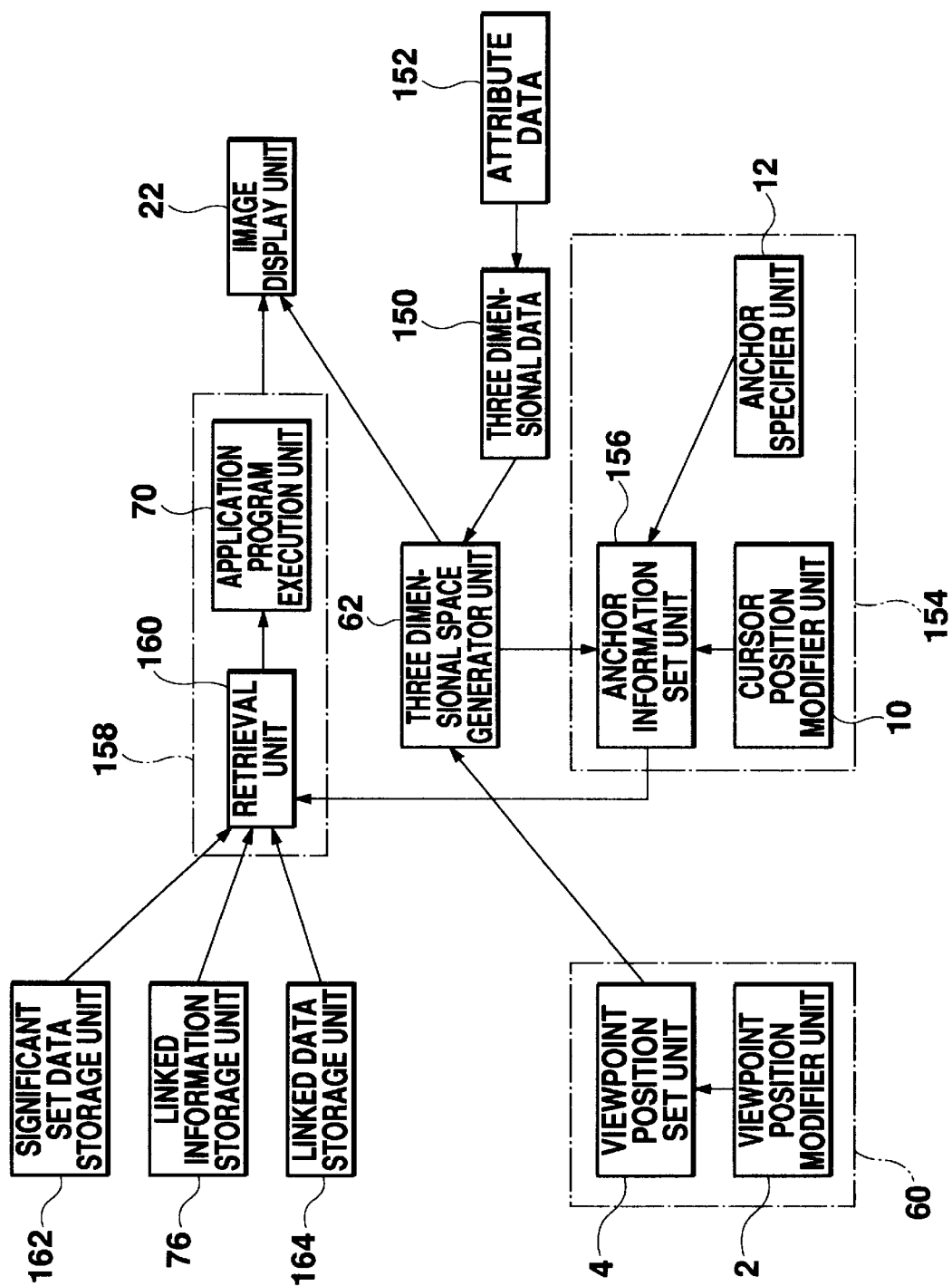
FIG. 7: Basic functional block diagram of an information retrieval apparatus for performing retrieval in a virtual space according to a third embodiment of this invention.

In the first embodiment, an object existing within a virtual three dimensional space is specified as an anchor for linked information. An apparatus of a third embodiment includes a configuration not only allowing an object to be specified as an anchor as in the first embodiment, but additionally allowing significant set data to be referenced as shown in FIG. 7 and linked information to be retrieved with significance information as an anchor. The information retrieval apparatus of the third embodiment is described below.

FIG. 7 is a basic block diagram of the information retrieval apparatus of the third embodiment for performing retrieval in virtual space. In this embodiment, compositional elements having identical or equivalent functions with those in the aforementioned embodiments will be given the same reference numerals and their description will be omitted. A functional configuration of this apparatus will be described with reference to FIG. 7.

As in the first embodiment, three dimensional data 150 includes data on the shape of a virtual object and information on object ID. Attribute data 152 includes significance attribute data attached to a virtual object defined in three dimensional data 150 and, together with three dimensional data 150, is stored in a storage device, such as a magnetic disk drive. A significance attribute specifier unit 154 includes cursor position modifier unit 10, anchor specifier unit 12, and an anchor information set unit 156.

Anchor information set unit 156 has functions similar to those of anchor information set unit 14 in the first embodiment. However, they have the following essential differences. In other words, when a virtual object is specified, anchor information set unit 14 of the first embodiment outputs an object ID corresponding to the virtual object. In contrast to this, when a virtual object is specified, anchor information set unit 156 of this embodiment outputs significance attribute data mapped to the relevant virtual object among information passed from three dimensional space generator unit 62.

A linked information processing unit 158 includes a retrieval unit 160 and application program execution unit 70.

Retrieval unit 160 is similar to retrieval unit 6 of the first embodiment in that it retrieves linked information based on information from the anchor information set unit and outputs the linked information to application program execution unit 70. However, it differs considerably in that it performs retrieval using significance information as an anchor. This difference is detailed in the operation to be described later. A significant set data storage unit 162 is a storage device, such as a magnetic disk drive, in which significant set data defining a relationship between significance information and a significance attribute output from anchor information set unit 156 is stored beforehand. A link data storage unit 164 is a storage device, such as a magnetic disk drive, in which linked data indicating a relationship between significance information and a pointer to linked information is stored beforehand.

An operation is described next. The operation for setting a viewpoint position through viewpoint manipulation unit 60 is the same as in the first embodiment. The operation for specifying a virtual object using cursor position modifier unit 10 and anchor specifier unit 12 in significance attribute specifier unit 154 is also the same as in the first embodiment. A characteristic of this embodiment lies in a subsequent operation, and the operation is described with reference to FIG. 8.

Figure 8:
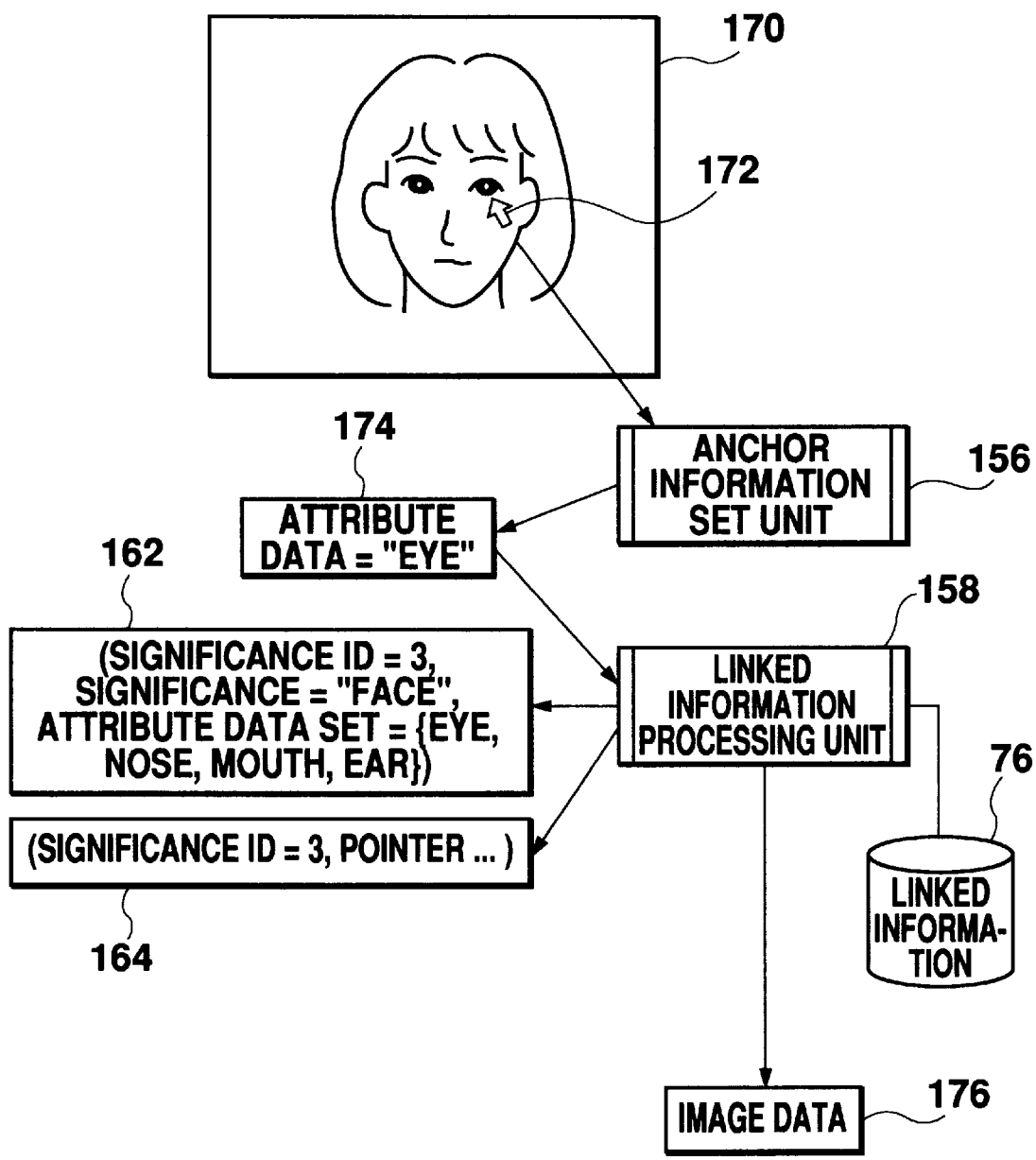
FIG. 8: Schematic diagram showing an example of an operation for retrieving linked information from a virtual object specified through anchor information set unit in the third embodiment of this invention.

FIG. 8 is a schematic diagram showing an example of an operation for retrieving linked information from a virtual object in a virtual three dimensional space specified by anchor information set unit 156. A three dimensional image 170 represents computer graphics of a person's face generated by three dimensional space generator unit 62 according to three dimensional data 150. In this image, a cursor 172 is moved to an "eye" by cursor position modifier unit 10 (such as a mouse). When an operation of anchor specifier unit 12 (such as clicking of a mouse button) is performed here, anchor information set unit 156 selects the virtual object representing the "eye". Anchor information set unit 156 examines information on the relevant virtual object among the information passed from three dimensional space generator unit 62, and retrieves it if significance attribute data 174 (representing a significance of the virtual object) has been defined. In this example, significance attribute data represents a significance called "eye". Significance attribute data 174 is passed to linked information processing unit 158.

At linked information processing unit 158, retrieval unit 160 references significant set data storage unit 162 with the significance attribute as a key. If corresponding significant set data exists, the significance defined therein is used as an anchor. The significant set data is, for example, a combination of a "significance", an attribute data set, which is a set of significance attributes having relevancy to the "significance", and a significance ID having a one-to-one correspondence with the "significance". According to this example, "eye", "nose", "mouth", and "ear" have a common point in that all are parts of a face. An attribute data set is defined to include significance attributes "eye", "nose", "mouth", and "ear" as elements, and with respect to the attribute data set an attached significant set data is defined with a concept of a "face" to group the elements as significance information. A result of retrieval unit 160 referencing significant set data storage unit 162 is that significance information "face" is used as an anchor.

In concrete terms, retrieval unit 160 fetches a significance ID corresponding to the significance information from significant set data storage unit 162, then references linked data storage unit 164 with the significance ID as a key and fetches linked data. Linked data represents a combination of the significance ID and a pointer to a file of linked information corresponding to the significance ID. Retrieval unit 68 references linked information storage unit 76 using the pointer obtained from the linked data. Subsequent operations correspond to those of the first embodiment and their description will be omitted.

According to this apparatus, in addition to the function of the first embodiment where a single three dimensional object existing in a virtual three dimensional space can be set as an anchor, a function is included where a three dimensional object is grouped into a significant set which can be set as an anchor. The ability to link linked information to a significant set enables the retrieval of the same linked information for different objects as long as they belong to the same significant set. In the example above, the information related to "face" that is displayed on image display unit 22 after "eye" was selected in three dimensional image 170 will be displayed on image display unit 22 even if "nose" or "mouth" is selected on three dimensional image 170.

Naturally, in the apparatus of the first embodiment, besides registering the individual parts, such as "eye", as virtual objects, a similar retrieval can be performed by registering the entire "face" as a virtual object in three dimensional data 150. However, since a group for "face", is defined as significant set data in this apparatus, a composition relating to the virtual objects can be easily modified or appended afterward.

Fourth Embodiment

Figure 9:
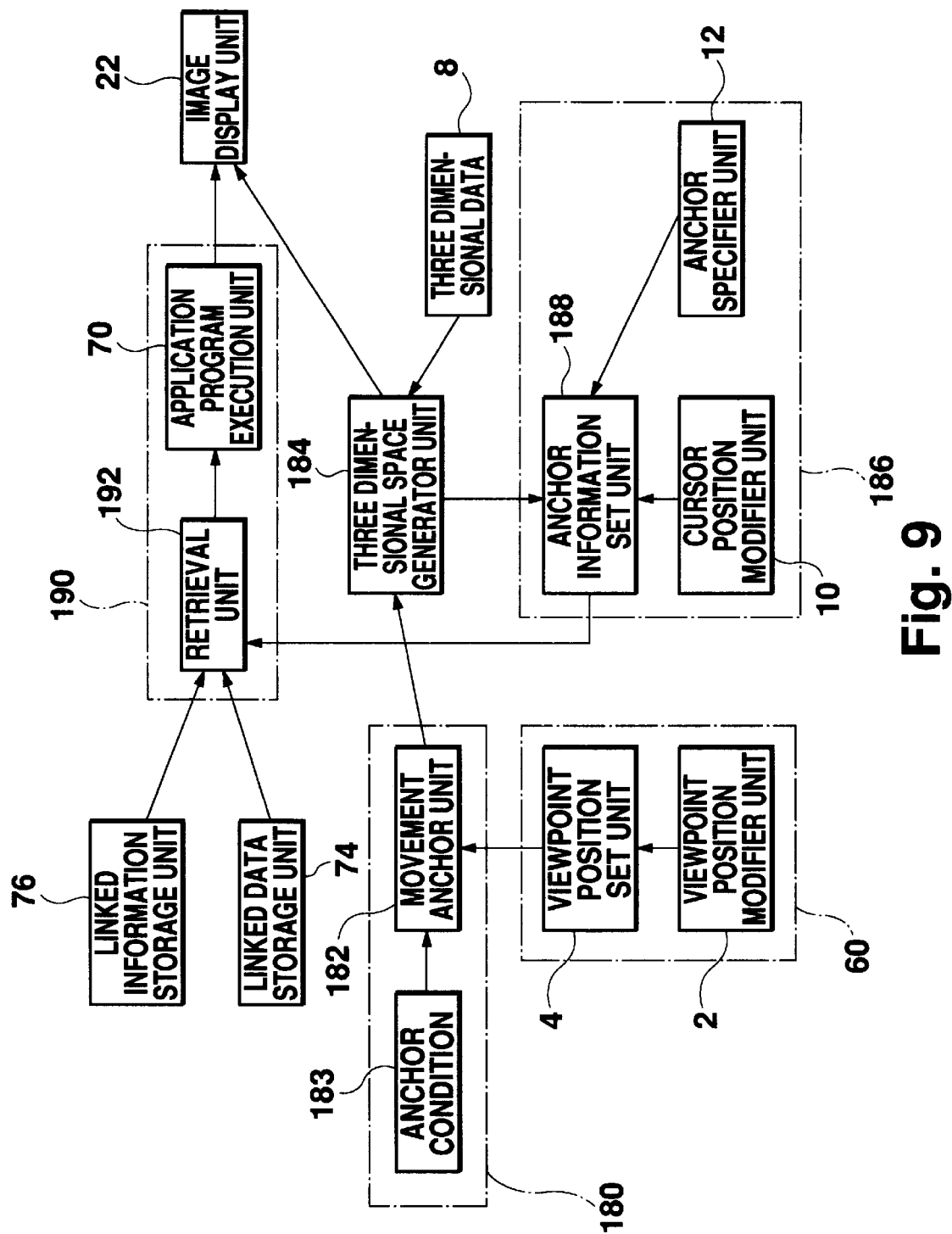
FIG. 9: Basic functional block diagram of an information retrieval apparatus for performing retrieval in a virtual space according to a fourth embodiment of this invention.

The apparatus of the first embodiment could specify an object existing within a virtual three dimensional space as an anchor for linked information. An apparatus of a fourth embodiment can not only specify an object as an anchor as in the first embodiment but also as shown in FIG. 9 includes a movement anchor generator unit 180 so that a modification of a viewpoint vector can be set as an anchor. The information retrieval apparatus of the fourth embodiment is described below.

FIG. 9 is a basic block diagram of the information retrieval apparatus of the fourth embodiment for performing retrieval in virtual space. In this embodiment, compositional elements having equivalent functions with those in the aforementioned embodiments will be given the same reference numerals and their description will be omitted. A configuration of this apparatus will be described with reference to FIG. 9.

Movement anchor generator unit 180 includes a movement anchor unit 182 and an anchor condition 183. Movement anchor unit 182 has a function of receiving viewpoint vector data from viewpoint manipulation unit 60 and setting it to a three dimensional space generator unit 184, as well as functions of setting the viewpoint vector or a change thereof as an anchor when the phenomenon satisfies a prescribed condition, defining data for a virtual object to represent the anchor, and outputting the data to three dimensional space generator unit 184. Movement anchor unit 182 may be, in concrete terms, a central processing unit (CPU) in a computer for executing prescribed programs.

For the convenience of description, an anchor which movement anchor generator unit 180 sets is called herein a movement anchor to distinguish it from an anchor defined for an ordinary virtual object of the aforementioned embodiments. Anchor condition 183 is data in which a condition for movement anchor unit 182 to generate a movement anchor has been defined beforehand. For example, a condition to be set for movement anchor for when a viewpoint vector points in a specific direction or to a specific object or when a viewpoint position moves in a specific direction or to a specific object, and data of a virtual object corresponding to the movement anchor are registered. Anchor condition 183 is stored in a storage device, such as a magnetic disk drive.

Three dimensional space generator unit 184 performs a processing similar to that of three dimensional space generator unit 62 of the first embodiment. However, three dimensional space generator unit 184 differs from three dimensional space generator unit 62 by also handling data of a virtual object obtained from movement anchor unit 182 in addition to data of a virtual object obtained from three dimensional data 8. An anchor determining unit 186 includes an anchor information set unit 188, cursor position modifier unit 10, and anchor specifier unit 12. Anchor information set unit 188 has a function basically similar to that of anchor information set unit 14 of the first embodiment, except for inputting information on a virtual object that indicates a movement anchor from three dimensional space generator unit 184. A linked information processing unit 190 includes a retrieval unit 192 and application program execution unit 70. Retrieval unit 192 has a function similar to that of retrieval unit 68 of the first embodiment, except for inputting an object ID of a virtual object that indicates a movement anchor.

An operation is described next. When viewpoint position modifier unit 2 manipulates a viewpoint vector, viewpoint position set unit 4 passes information on the viewpoint vector to movement anchor unit 182. Movement anchor unit 182 judges whether or not the viewpoint vector or a change thereof meets a condition defined in anchor condition 183. If it meets the condition, the data of the virtual object indicating the movement anchor of anchor condition 183 is output to three dimensional space generator unit 184.

For example, in anchor condition 183, a viewpoint position is located at a fork of a "road" defined in the virtual three dimensional space, and a condition for generating a movement anchor when a line of sight points toward the east, and data for an icon labeled with the characters "EAST" for a virtual object corresponding to the movement anchor are set. When movement anchor unit 182 moves a viewpoint position to the fork, based on information on a viewpoint vector from viewpoint position set unit 4, and detects a modification phenomenon where a line of sight direction initially pointing north is modified to point east, anchor condition 183 is referenced at this phenomenon, and data of the aforementioned icon is output to three dimensional space generator unit 184.

Figure 10:
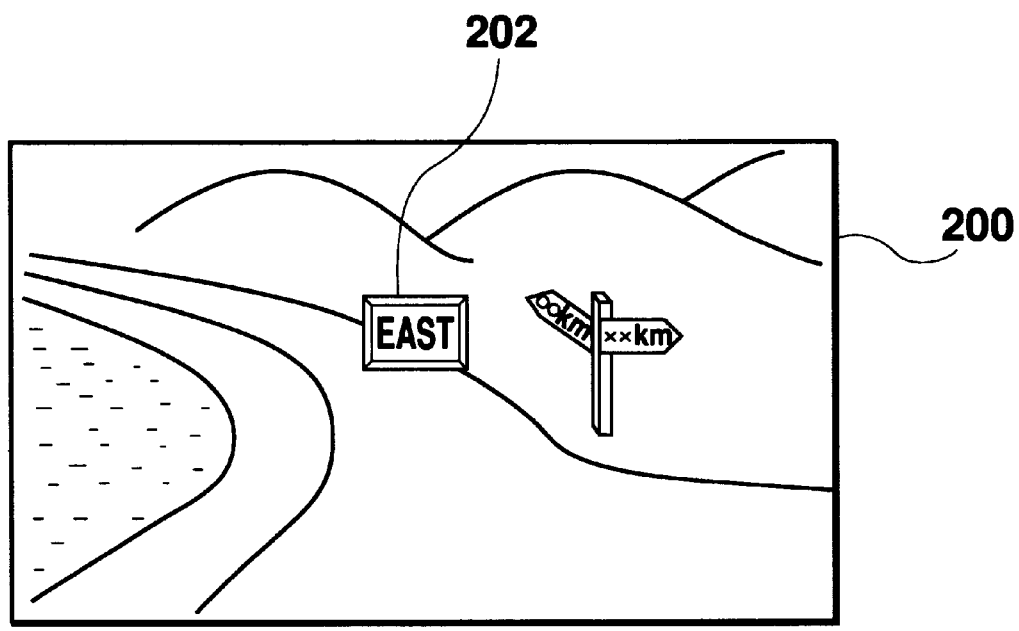
FIG. 10: Schematic diagram showing an example of a three dimensional space generator unit generating a three dimensional image in the fourth embodiment of this invention.

FIG. 10 is a schematic diagram of the three dimensional image that three dimensional space generator unit 184 generates in this example. Three dimensional space generator unit 184 displays the aforementioned icon 202 as a virtual object indicating the aforementioned movement vector on an three dimensional image 200. Three dimensional space generator unit 184, in addition to the generation of the three dimensional image, outputs the icon's coordinates and attribute data, in the same manner as other virtual objects, to anchor information set unit 188.

Anchor information set unit 188, using the same operation as selecting an object existing in a virtual three dimensional space, selects an object generated to indicate a movement anchor, such as the aforementioned icon 202. Then, an object ID attached to the virtual object is output to retrieval unit 192. Retrieval unit 192 retrieves linked data from linked data storage unit 74 based on the object ID and, based on an obtained pointer, references linked information storage unit 76, fetches linked information, and passes it to application program execution unit 70.

As described above, a movement anchor is generated by movement anchor unit 182 when the viewpoint position has moved toward a specific three dimensional object or a specific direction or the viewpoint vector has pointed to a specific three dimensional object or a specific direction. Referring to another example, if celestial bodies, such as the moon or sun, are arranged as virtual objects assuming outer space in the three dimensional space, a movement anchor relating to the moon is generated when a spaceship moves toward an object corresponding to the moon.

Fifth Embodiment

Figure 11:
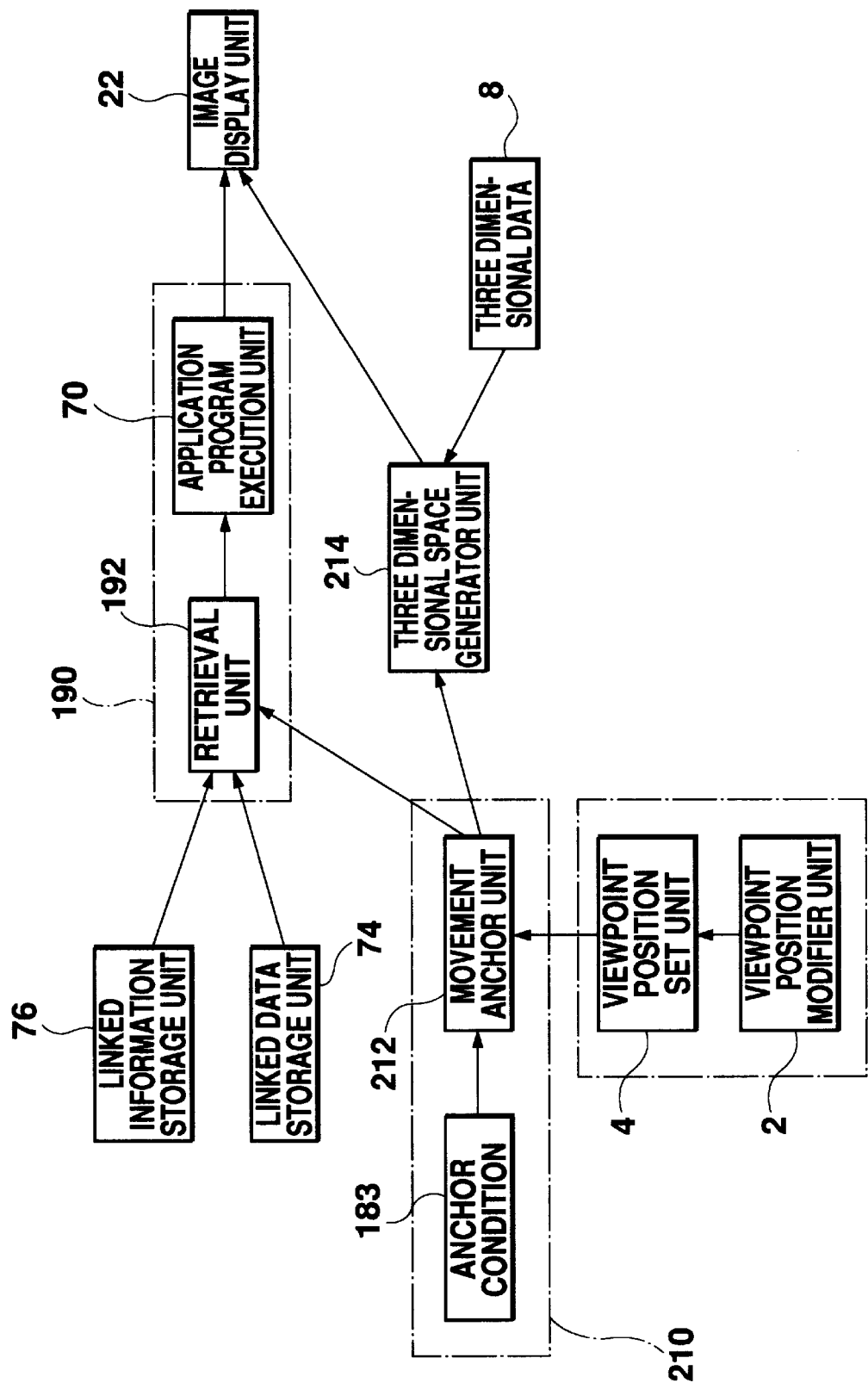
FIG. 11: Basic functional block diagram of an information retrieval apparatus for performing retrieval in a virtual space according to a fifth embodiment of this invention.

In the aforementioned embodiments it is necessary to activate a retrieval of linked information by having the user select a virtual object. In an apparatus of a fifth embodiment to be described next, as shown in FIG. 11, the movement anchor generator unit directly activates the retrieval unit according to modification of a viewpoint vector so that retrieval is automatically executed without the user having to activate the retrieval executions one by one. The information retrieval apparatus of the fifth embodiment is described next.

FIG. 11 is a basic block diagram of the information retrieval apparatus of the fifth embodiment for performing retrieval in virtual space. In this embodiment, compositional elements having equivalent functions with those in the aforementioned embodiments will be given the same reference numerals and their description will be omitted. A functional configuration of this apparatus will be described with reference to FIG. 11.

A movement anchor generator unit 210 includes a movement anchor unit 212 and anchor condition 183. Movement anchor unit 212 has a function of generating a movement anchor. As this function is identical to that of movement anchor unit 182 of the fourth embodiment, its description will be omitted. Movement anchor unit 212 differs from movement anchor unit 182 of the fourth embodiment in that an activation signal for retrieval is sent to retrieval unit 192 when a movement anchor is generated. In this apparatus, it is not necessary for the user to select an anchor since movement anchor unit 212 generates the activation signal. Thus, anchor determining unit 186 found in the fourth embodiment is unnecessary in this embodiment. A three dimensional space generator 214 sets a viewpoint vector from movement anchor unit 212 and generates a three dimensional image based on data of a virtual object of three dimensional data 8.

An operation is described next. When viewpoint position modifier unit 2 manipulates a viewpoint vector, viewpoint position set unit 4 passes information on the viewpoint vector to movement anchor unit 212. Movement anchor unit 212 outputs data of a virtual object representing the movement anchor to three dimensional space generator unit 214 and outputs an object ID to retrieval unit 192 according to a judgment result of whether or not the viewpoint vector or a change thereof meets a condition that was defined in anchor condition 183. Retrieval unit 192 receives the object ID, then automatically initiates retrieval of linked information. This method of retrieval is identical to that in the fourth embodiment so its description will be omitted. The retrieved linked information is output to a corresponding application program execution unit 70. Application program execution unit 70 processes the linked information, generates information display image data, and displays this on image display unit 22.

In the description above, movement anchor unit 212 outputs data for the virtual object representing the movement anchor to three dimensional space generator unit 214 and displays it in a three dimensional image. However, in this apparatus, the image of the virtual object representing the movement anchor on the three dimensional image differs from that in the fourth embodiment in that it is not for specifying the relevant virtual object and activating retrieval. As described above, the retrieval in this apparatus is automatically initiated by the generation of a movement anchor from manipulation of a viewpoint vector. The image of the virtual object need only have a function indicating what is being retrieved and a virtual object corresponding to the movement anchor is not displayed as needed.

This apparatus may include an anchor determining unit as in the aforementioned embodiments and provide both an environment using the anchor determining unit to enable the user to optionally retrieve necessary information and an environment where information is automatically retrieved in prescribed cases without using the anchor determining unit. The automatic retrieval of the latter is especially convenient when presenting information that must be shown to the user.

Sixth Embodiment

In the aforementioned embodiments, the user manipulates a program switch to select, for example, whether or not to identifiably display if a virtual object on a three dimensional image is an anchor. However, automatic selection based on a condition or state was not possible.

Figure 12:
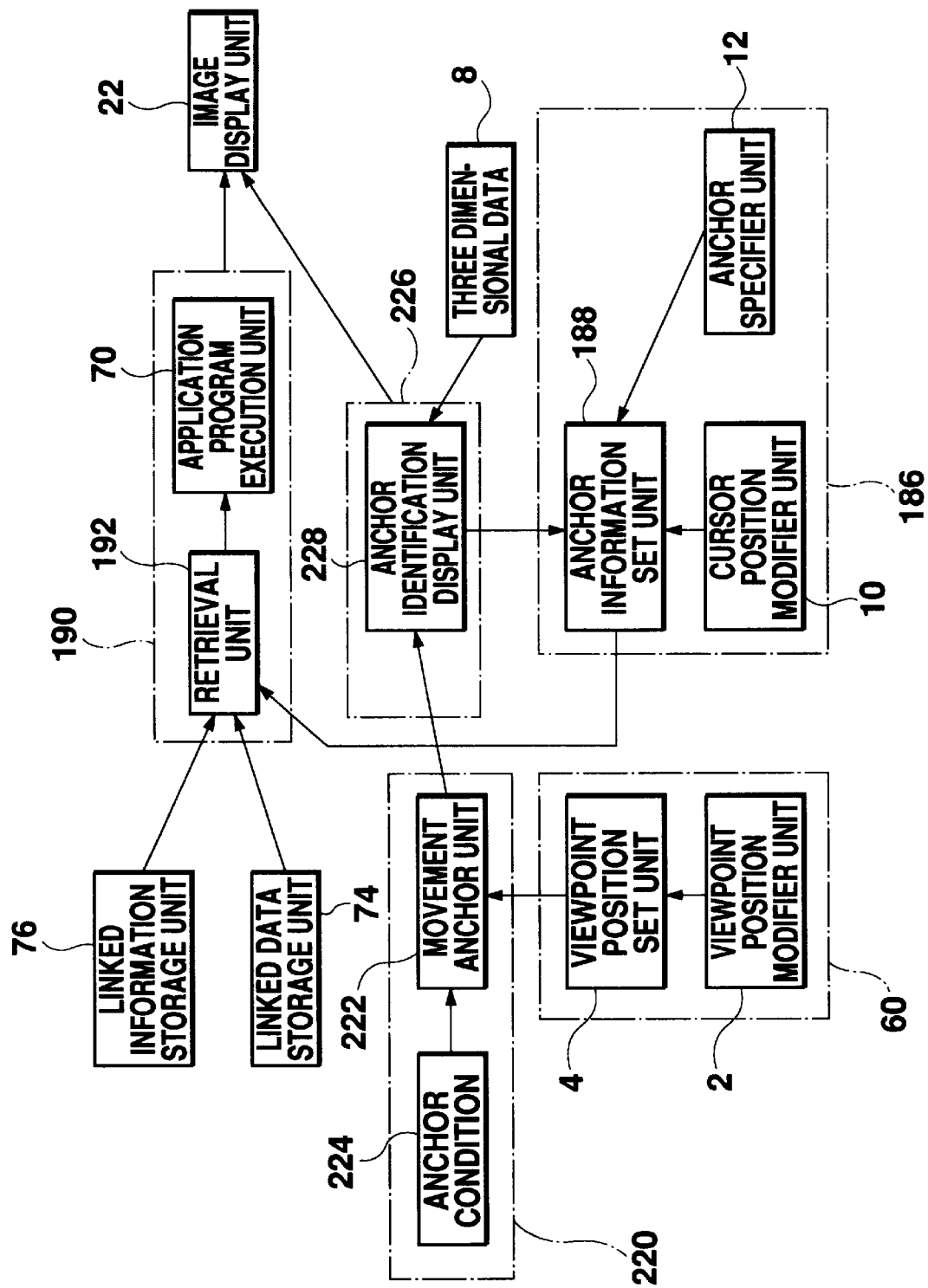
FIG. 12: Basic functional block diagram of an information retrieval apparatus for performing retrieval in a virtual space according to a sixth embodiment of this invention.

As shown in FIG. 12, to perform an on-off operation to set the display state of an anchor to be identifiable while linked to a viewpoint vector, an apparatus of a sixth embodiment includes an anchor display condition set unit 220 for setting a movement anchor as a switch to select the aforementioned display state.

FIG. 12 is a basic block diagram of the information retrieval apparatus of the sixth embodiment for performing retrieval in virtual space. In this embodiment, compositional elements having identical or equivalent functions with those in the aforementioned embodiments will be given the same reference numerals and their description will be omitted. A functional configuration of this apparatus will be described with reference to FIG. 12.

Anchor display condition set unit 220 includes a movement anchor unit 222 and an anchor condition 224. In addition to a function for receiving a viewpoint vector from viewpoint manipulation unit 60 and setting it to three dimensional space generator unit 184, movement anchor unit 222 generates an identification display command to identifiably display on a three dimensional image a virtual object corresponding to a viewpoint vector or a change thereof, when the phenomenon satisfies a prescribed condition. Movement anchor unit 222 may be configured similarly to the movement anchor units in the aforementioned fourth and fifth embodiments, and for this reason an identical name was labeled herein.

Anchor condition 224 represents data in which movement anchor unit 222 has defined beforehand a condition for generating an identification display command, and a condition for generating a relevant signal when a viewpoint vector points in a specific direction or to a specific object or when a viewpoint position moves to a specific direction or to a specific object, and information for specifying a virtual object for which identification display has been set on are registered. Anchor condition 224 is stored in a storage device, such as a magnetic disk drive. Anchor condition 224 is similar to anchor condition 183 of the aforementioned fourth and fifth embodiments so is labeled with an identical name. Anchor condition 224 may be integrated with anchor condition 183.

A three dimensional space generator unit 226, in addition to providing a function of the aforementioned embodiments, includes an anchor identification display unit 228. Anchor identification display unit 228 receives the aforementioned identification display command and identifiably displays the specified virtual object.

An operation is described next. When viewpoint position modifier unit 2 manipulates a viewpoint vector, viewpoint position set unit 4 passes information on the viewpoint vector to movement anchor unit 222. Movement anchor unit 222 outputs an identification display command to three dimensional space generator unit 226 according to a judgment result of whether the viewpoint vector or a change thereof meets a condition defined in anchor condition 224. The identification display command is a signal storing, for example, viewpoint vector information, an indication mode, and subject range information. The indication mode specifies a condition for modifying a display state, such as of a virtual object positioned in the direction of change of a viewpoint position or of a virtual object positioned in a line of sight direction, or a type of display state, such as a display state in which a brightness changes periodically (blinking state), a color is changed, or an outline of the virtual object is emphasized. The information regarding the subject range specifies the angle range centering on the direction of movement or line of sight direction within which the display state of virtual objects is to be switched.

Anchor identification display unit 228 of three dimensional space generator unit 226 inputs the identification display command, and based on the command, modifies an image generation parameter so as to modify the display state of only a virtual object existing in the subject range that has been set as an anchor. Three dimensional space generator unit 226 generates an image based on three dimensional data 8, the viewpoint vector, and information that anchor identification display unit 228 has modified, and outputs it to image display unit 22. A processing to specify an anchor on a three dimensional image, and to perform retrieval and display is equivalent to that in the first and fourth embodiments and its description will be omitted.

In this apparatus, all virtual objects specified as anchors in the three dimensional image are not displayed as a group to be identifiable from virtual objects that are not anchors or from background space, and only virtual objects existing in a user's line of sight or direction of movement in a virtual three dimensional space and specified as anchors are identifiably displayed.

Seventh Embodiment

In the apparatus of the first embodiment, the cursor on the three dimensional image is displayed so as to move on the cursor movement plane. Thus, as described above, there was a problem where the cursor became hidden by a virtual object positioned in front of the cursor movement plane. Furthermore, in the method of covering the foremost plane of the virtual three dimensional space with the cursor movement plane, there was a problem where the three dimensional perspective was lost. In the seventh embodiment, an anchor determining unit 230 is installed as shown in FIG. 13 in order to improve the user interface by representing a cursor that moves as if within a virtual three dimensional space, which can more easily be used by the user.

Figure 13:
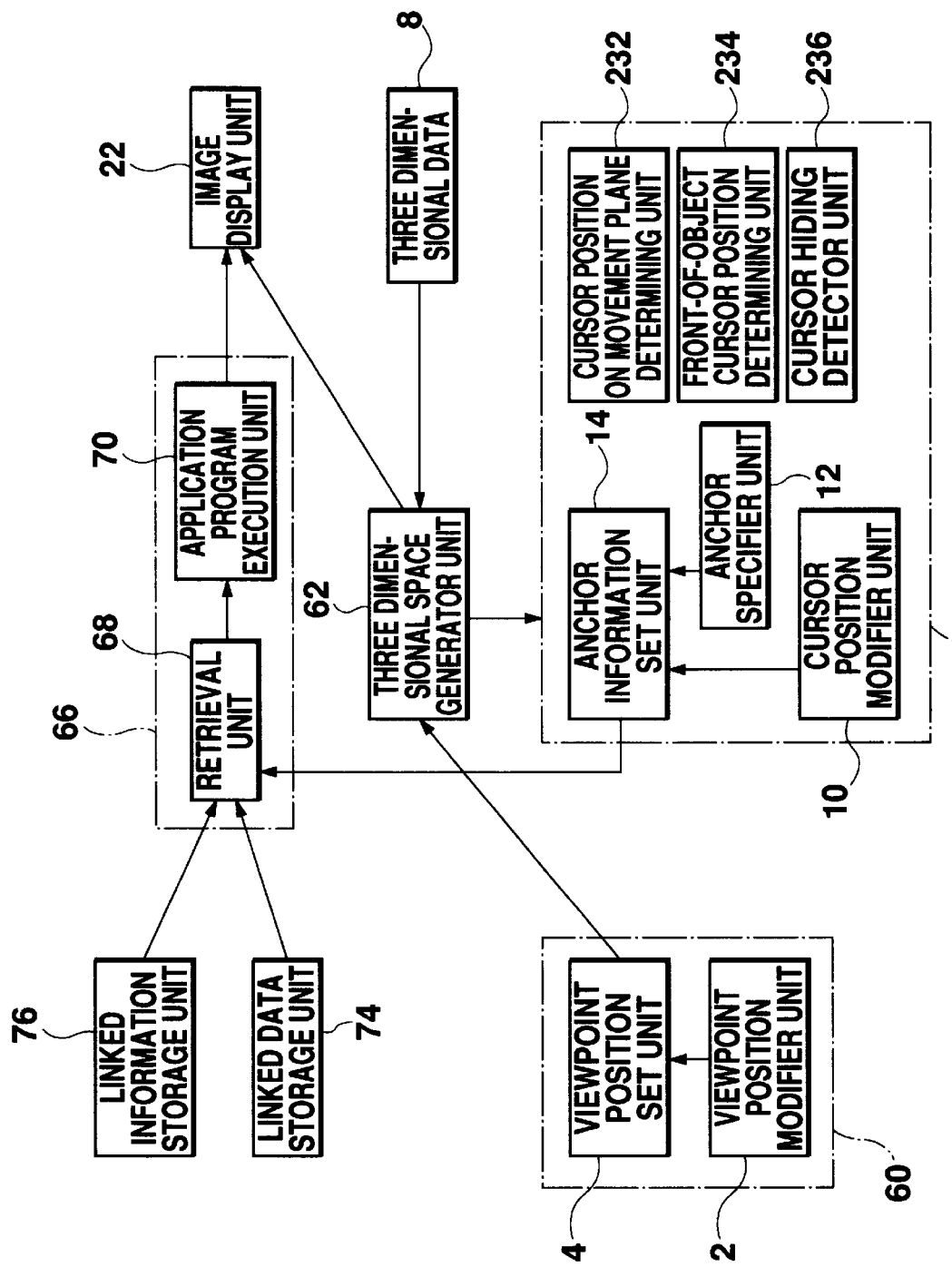
FIG. 13: Basic functional block diagram of an information retrieval apparatus for performing retrieval in a virtual space according to a seventh embodiment of this invention.

FIG. 13 is a basic block diagram of the information retrieval apparatus of the seventh embodiment for performing retrieval in virtual space. In this embodiment, compositional elements having equivalent functions with those in the aforementioned embodiments will be given the same reference numerals and their description will be omitted. A functional configuration of this apparatus will be described.

Anchor determining unit 230 includes cursor position modifier unit 10, anchor specifier unit 12, anchor information set unit 14, a cursor position on movement plane determining unit 232, a front-of-object cursor position determining unit 234, and a cursor hiding detector unit 236. Cursor position on movement plane determining unit 232 transforms coordinate data for manipulating a cursor position obtained from cursor position modifier unit 10 into a cursor generation position where a cursor is to be positioned on a cursor movement plane provided in a virtual three dimensional space. Cursor hiding detector unit 236 detects a phenomenon (referred to hereinafter as cursor hiding) where the cursor generation position on the cursor movement plane hides behind a virtual object on a three dimensional image. In a cursor hiding state, front-of-object cursor position determining unit 234 modifies the cursor generation position to a position, which is not on the cursor movement plane, in front of the virtual object hiding the cursor, such as on a surface on the viewpoint side of the relevant virtual object. Cursor position on movement plane determining unit 232, front-of-object cursor position determining unit 234, and cursor hiding detector unit 236 are, for example, in concrete terms, central processing units (CPU) in computers executing their respective prescribed programs.

An operation is described next. Three dimensional space generator unit 62 generates a virtual three dimensional space based on three dimensional data 8 and a viewpoint vector obtained from viewpoint position set unit 4. Data for the virtual three dimensional space transformed into the CRT coordinate system is supplied to anchor determining unit 230. An anchor specifying function in anchor determining unit 230 is identical to that in the first embodiment.

Cursor position on movement plane determining unit 232 of anchor determining unit 230 generates a cursor generation position from coordinate data for manipulating a cursor position obtained from cursor position modifier unit 10 and cursor movement plane set in a virtual three dimensional space and outputs it to cursor hiding detector unit 236.

Cursor hiding detector unit 236 judges the relationship in the CRT coordinate system between the cursor generation position and the coordinate data of the virtual object within the virtual three dimensional space from three dimensional space generator unit 62. If the cursor generation position is not hidden by the virtual object, the cursor generation position is output to anchor information set unit 14. On the other hand, if the cursor generation position is hidden behind the virtual object, cursor hiding detector unit 236 notifies front-of-object cursor position determining unit 234.

When front-of-object cursor position determining unit 234 receives this notification, the cursor generation position that cursor position on movement plane determining unit 232 generated is moved to the front in the direction of depth (z-axis) of the CRT coordinate system, and a new cursor generation position in front of the relevant virtual object is set and output to anchor information set unit 14. Anchor information set unit 14 displays a cursor on image display unit 22 based on the cursor generation position obtained from cursor position on movement plane determining unit 232 or front-of-object cursor position determining unit 234.

Eighth Embodiment

In the first embodiment, the cursor on the three dimensional image is displayed so as to move on the cursor movement plane, and this cursor specifies a virtual object on an extension to the cursor side of a line connecting the viewpoint position and the cursor. This line is perpendicular to the screen in the CRT coordinate system where coordinates have been transformed for perspective projection. Therefore, if multiple virtual objects exist on this line, these virtual objects overlap on the image. Thus, in the apparatus of the first embodiment, the foremost virtual object could be specified while the virtual objects in the back could not be specified. In the eighth embodiment, a subject modifier unit is installed to display a cursor in a three dimensional space and enable the overlapping virtual objects to be sequentially selected as shown in FIG. 14 in order to achieve an easy to use user interface with the cursor in the virtual three dimensional space.

Figure 14:
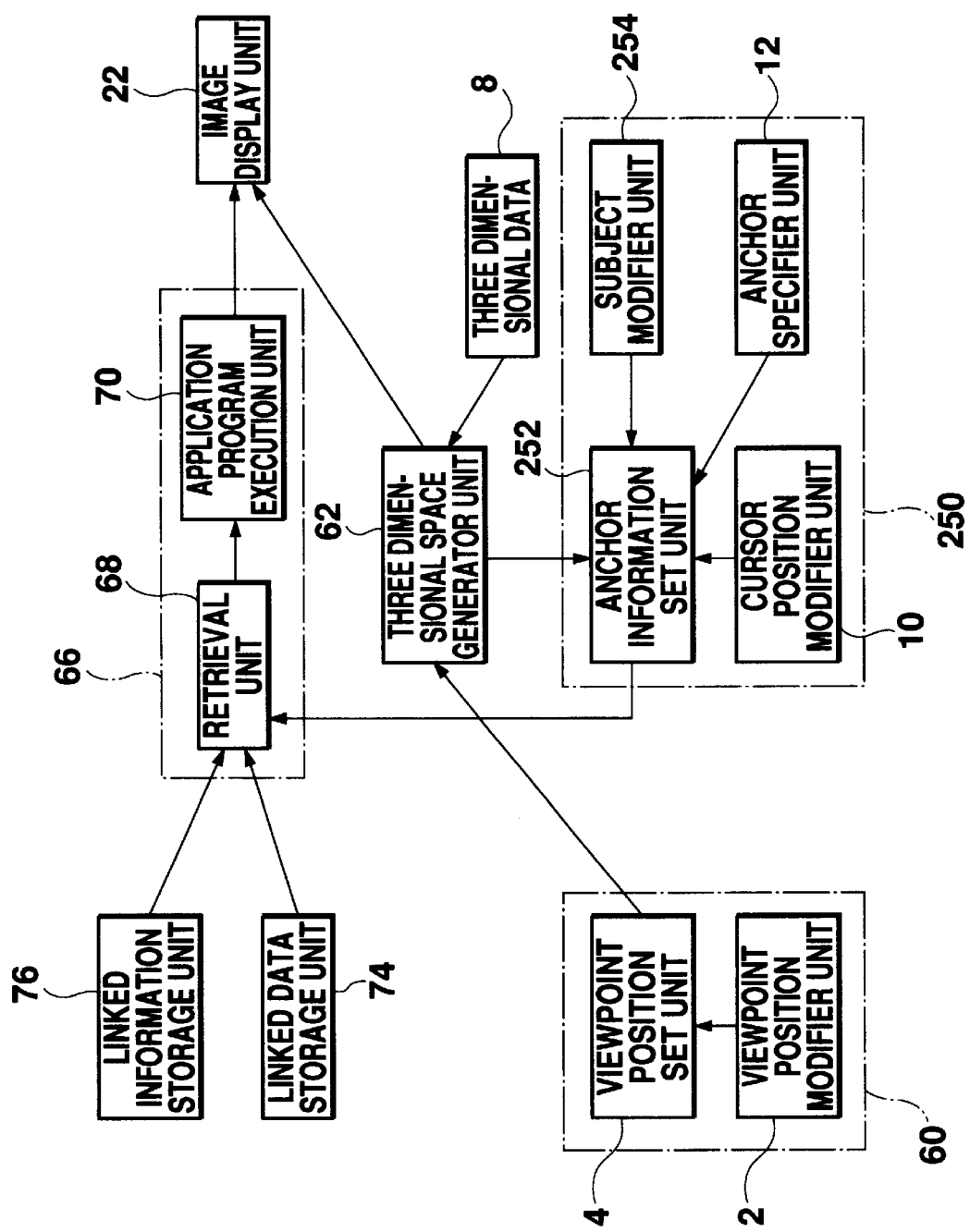
FIG. 14: Basic functional block diagram of an information retrieval apparatus for performing retrieval in a virtual space according to an eighth embodiment of this invention.
Figure 15:
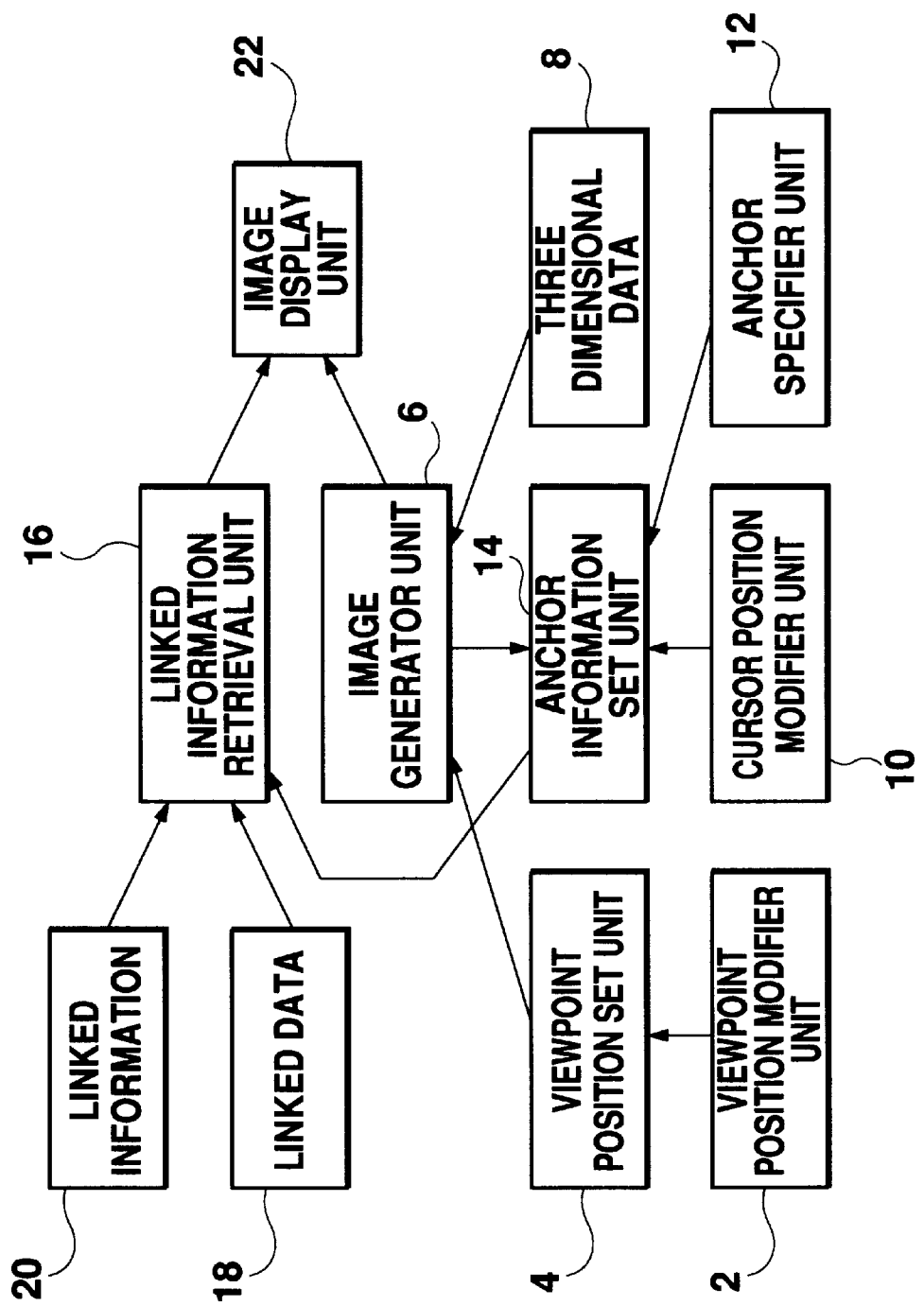
FIG. 15: Basic functional block diagram of a conventional information retrieval apparatus for performing retrieval in a virtual space.
Figure 16A:
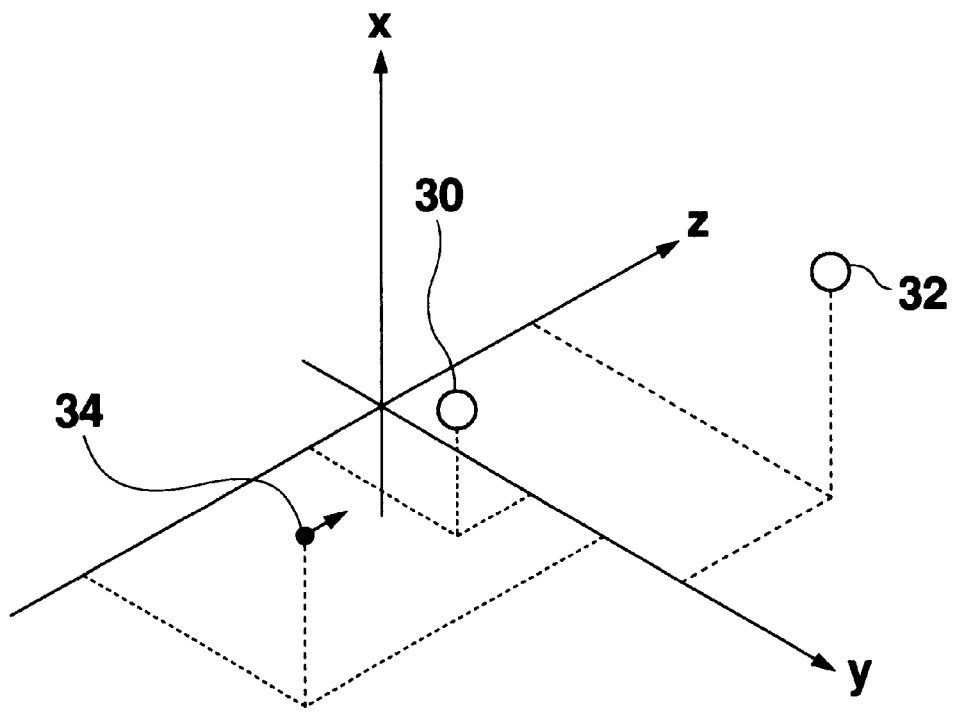
FIG. 16a: Schematic diagram showing an example of a virtual three dimensional space to illustrate an operation of the conventional information retrieval apparatus.
Figure 16B:
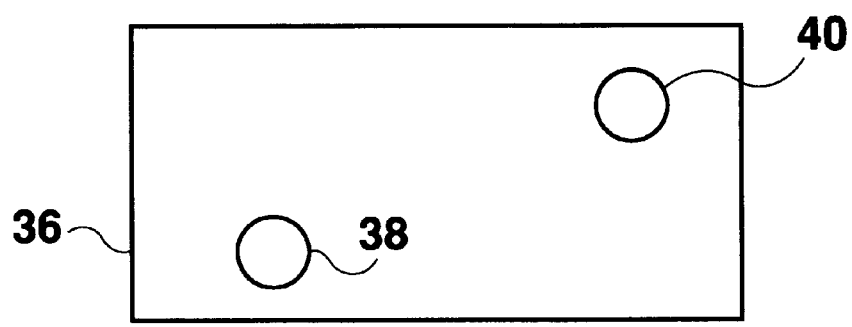
FIG. 16b: Schematic diagram showing an example of an image generated from an image generator unit in the conventional information retrieval apparatus.
Figure 17A:
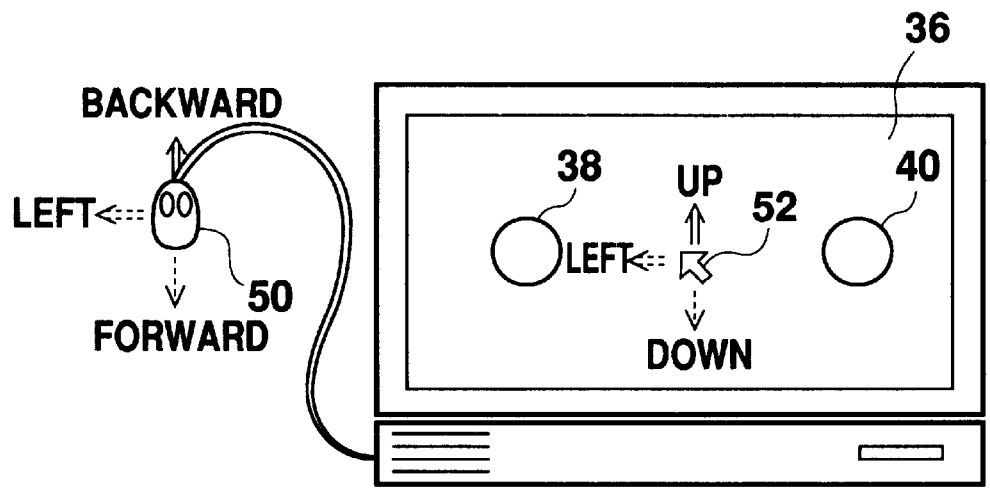
FIGS. 17a and 17b: Schematic diagrams illustrating operations of a cursor position modifier unit and of an anchor specifier unit, respectively, in the conventional information retrieval apparatus.
Figure 17B:
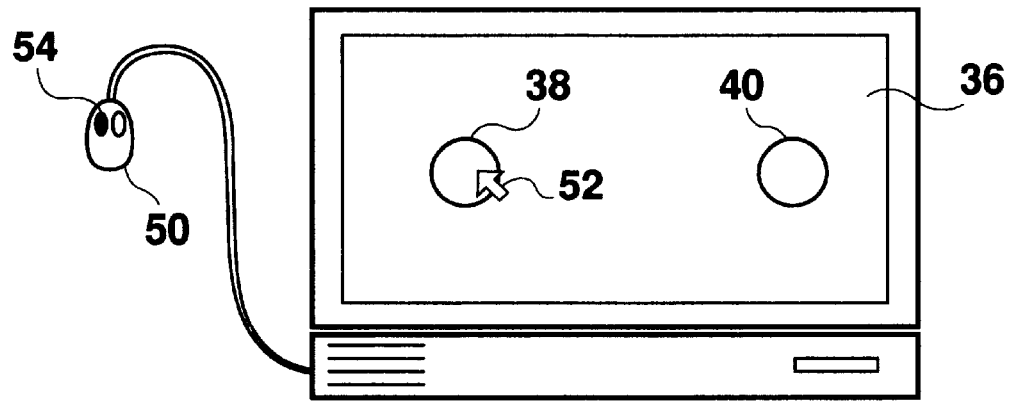
Figure 18:
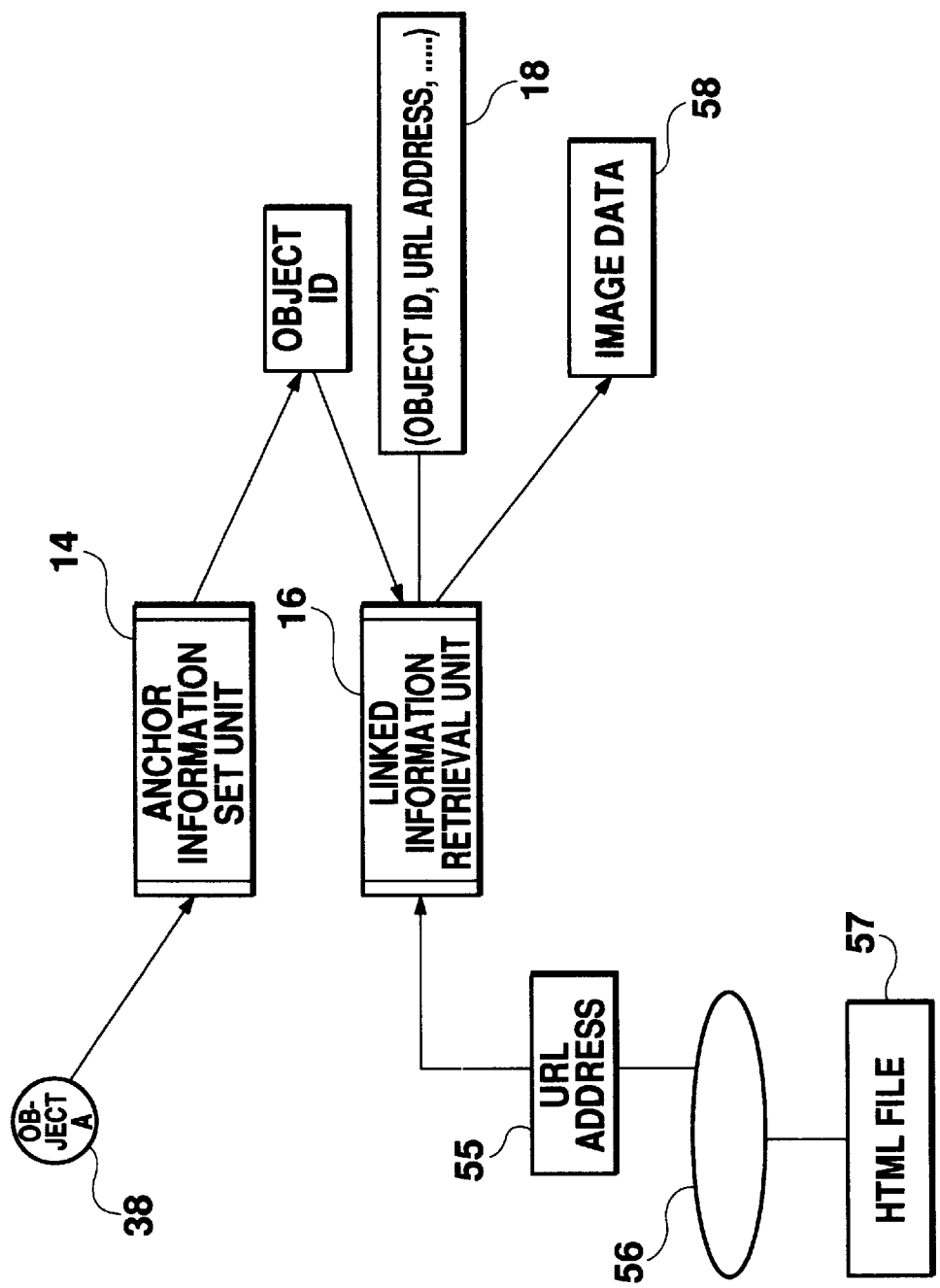
FIG. 18: Schematic diagram showing an example of an operation for retrieving linked information from a virtual object specified through an anchor information set unit in the conventional information retrieval apparatus.

FIG. 14 is a basic block diagram of the information retrieval apparatus of the eighth embodiment for performing retrieval in virtual space. In this embodiment, compositional elements having identical or equivalent functions with those in the aforementioned embodiments will be given the same reference numerals and their description will be omitted. A functional configuration of this apparatus will be described with reference to FIG. 14.

An anchor determining unit 250 includes cursor position modifier unit 10, anchor specifier unit 12, an anchor information set unit 252, and a subject modifier unit 254. Subject modifier unit 254 is a means, such as a keyboard, mouse button, or on-screen icon, for switching among virtual objects that the cursor is to specify if there are multiple virtual objects at a position on the cursor image. Anchor information set unit 252 outputs an object ID of a virtual object, which is an anchor to be specified by cursor position modifier unit 10, anchor specifier unit 12, and subject modifier unit 254.

An operation of the apparatus for specifying a virtual object while virtual objects are overlapped is described next.

Three dimensional space generator unit 62 sets a viewpoint vector through viewpoint manipulation unit 60 and generates a three dimensional image for a virtual three dimensional space defined by three dimensional data 8. A mode of three dimensional space generator unit 62 is switched for a wire frame display so that the user can see a state where the virtual objects overlap. The user manipulates cursor position modifier unit 10 and moves the cursor to the overlapped virtual objects that are displayed.

When a subject modifier signal is output from subject modifier unit 254 in this state through user manipulation, anchor information set unit 252 modifies an anchor where the cursor is positioned, for example, to a virtual object immediately behind the currently specified virtual object. In other words, each time subject modifier unit 254 is operated, for example, a right mouse button is clicked, the anchor where the cursor is positioned switches in sequence to a virtual object in the back. When subject modifier unit 254 is operated at the rearmost virtual object, the cursor returns to the foremost virtual object.

This cycle may be reversed. After subject modifier unit 254 is operated in this manner and the cursor position is switched to a desired virtual object among the overlapped virtual objects that are displayed, when anchor specifier unit 12 is operated, for example, a left mouse button is clicked, anchor information set unit 252 specifies the virtual object where the cursor is positioned as an anchor.

Although examples were given in the aforementioned first through eighth embodiments using a mouse for cursor position modifier unit 10, a means enabling two coordinates to be modified, such as a joystick, may be used to implement an apparatus achieving a similar effect to that of the aforementioned embodiments.

Furthermore, although examples were given using a left mouse button click for anchor specifier unit 12, a specific key on a keyboard may be used, for example, to obtain an apparatus achieving a similar effect to that of the aforementioned embodiments.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An information retrieval apparatus for retrieving, after an anchor is specified, linked information corresponding to a relevant anchor, comprising:

a plurality of types of application program execution units for generating an information display image according to various input information;

a linked information storage unit for storing said linked information to become said input information of one of said application program execution units;

a linked data storage unit for storing linked data that maps said anchor with said linked information;

a viewpoint manipulation unit for manipulating a viewpoint vector in a virtual three dimensional space constructed in a relevant apparatus;

a three dimensional space generator unit for generating a three dimensional image, which is an image in said virtual three dimensional space based on said viewpoint vector, rendering a three dimensional perspective;

an anchor determining unit for specifying on said three dimensional image said anchor defined by a virtual object within said virtual three dimensional space;

a retrieval unit for retrieving, based on said linked data, said linked information corresponding to specified said anchor, and supplying the retrieved linked information to said application program execution unit corresponding to the relevant linked information; and an image display unit for displaying said information display image, generated from said application program execution unit, on said three dimensional image.

2. An information retrieval apparatus according to claim 1, comprising an anchor display condition set unit for setting to said three dimensional space generator unit an anchor display condition corresponding to said viewpoint vector, wherein said three dimensional space generator unit includes an anchor identification display unit for switching a display state of said virtual object representing a relevant anchor according to whether or not said anchor meets said anchor display condition.

3. An information retrieval apparatus according to claim 1, wherein said anchor determining unit comprises:

a cursor position modifier unit for specifying coordinate data to manipulate a position of a cursor indicating said anchor;

a cursor position on movement plane determining unit for transforming said coordinate data into a cursor generation position on a cursor movement plane to be disposed on said virtual three dimensional space;

a cursor hiding detector unit for detecting the hiding state of a cursor positioned behind said virtual object when said cursor generation position on said cursor movement plane is on said three dimensional image;

a front-of-object cursor position determining unit for modifying, in said hiding state, said cursor generation position to a position in front of the relevant virtual object; and an anchor information set unit for displaying said cursor on said image display unit based on said cursor generation position.

4. An information retrieval apparatus according to claim 1, wherein said anchor determining unit includes:
- a cursor position modifier unit for manipulating a position on said three dimensional image of a cursor indicating said anchor; and
- a subject modifier unit for selecting which of a plurality of said virtual objects displayed while overlapped on said three dimensional image is to be indicated by said cursor.

5. An information retrieval apparatus for retrieving, after an anchor is specified, linked information corresponding to a relevant anchor, comprising:
- a plurality of types of application program execution units for generating an information display image according to various input information;
- a linked information storage unit for storing said linked information to become said input information of one of said application program execution units;
- a linked data storage unit for storing linked data that maps said anchor with said linked information;
- a three dimensional space generator unit for generating a three dimensional image, which is an image in said virtual three dimensional space, based on a viewpoint vector set within a virtual three dimensional space constructed in a relevant apparatus, rendering a three dimensional perspective;
- a set function unit for performing a viewpoint position set function to set said viewpoint vector to said three dimensional space generator unit, and an anchor information set function to specify a virtual object, which is an object within said virtual three dimensional space, to be mapped to said anchor, and fetch information for the relevant anchor from the relevant virtual object;
- a set modifier unit for supplying modification data of said viewpoint vector or coordinate data to become positional data for said anchor to said set function unit;
- a function determining unit for determining the function of said set function unit by switching said coordinate data for use as an input for either said viewpoint position set function or said anchor information set function;
- a retrieval unit for retrieving, based on said linked data, said linked information corresponding to said anchor specified through said set function unit, and supplying the retrieved information to said application program execution unit corresponding to the relevant linked information; and
- an image display unit for displaying said information display image, generated from said application program execution unit, on said three dimensional image.

6. An information retrieval apparatus for retrieving, after an anchor is specified, linked information corresponding to a relevant anchor, comprising:
- a plurality of types of application program execution units for generating an information display image according to various input information;
- a linked information storage unit for storing said linked information to become said input information of one of said application program execution units;
- a linked data storage unit for storing linked data that maps said anchor with said linked information;
- a viewpoint manipulation unit for manipulating a viewpoint vector in a virtual three dimensional space constructed in a relevant apparatus;
- a three dimensional space generator unit for generating a three dimensional image, which is an image in said virtual three dimensional space based on said viewpoint vector, at rendering a three dimensional perspective;
- a significance attribute specifier unit for specifying a virtual object within said virtual three dimensional space on said three dimensional image, and outputting a significance attribute that is mapped to the relevant virtual object;
- a significant set data storage unit for storing an attribute data set having said significance attribute as an element, and a significant set data, which defines significance information to be linked to the relevant attribute data set;
- a retrieval unit for finding, based on said significant set data, said significance information corresponding to said significance attribute that was output from said significance attribute specifier unit, retrieving said linked information based on said linked data with relevant significance information as said anchor, and supplying the relevant linked information that was retrieved to said application program execution unit corresponding to the relevant linked information; and
- an image display unit for displaying said information display image, generated from said application program execution unit, on said three dimensional image.

7. An information retrieval apparatus for retrieving, after an anchor is specified, linked information corresponding to a relevant anchor, comprising:
- a plurality of types of application program execution units for generating an information display image according to various input information;
- a linked information storage unit for storing said linked information to become said input information of one of said application program execution units;
- a linked data storage unit for storing linked data that maps said anchor with said linked information;
- a viewpoint manipulation unit for manipulating a viewpoint vector in a virtual three dimensional space constructed in a relevant apparatus;
- a movement anchor generator unit for generating data for a virtual object, which is an object within said virtual three dimensional space, to be mapped to a relevant anchor, with modification information of said viewpoint vector from said viewpoint manipulation unit as said anchor;
- a three dimensional space generator unit for generating a three dimensional image, which is an image in said virtual three dimensional space based on said viewpoint vector, rendering a three dimensional perspective;
- an anchor determining unit for specifying said anchor, defined by said virtual object, on said three dimensional image;
- a retrieval unit for retrieving, based on said linked data, said linked information corresponding to specified said anchor, and supplying the retrieved information to said application program execution unit corresponding to the relevant linked information; and an image display unit for displaying said information display image, generated from said application program execution unit, on said three dimensional image.

8. An information retrieval apparatus for retrieving, after an anchor is specified, linked information corresponding to a relevant anchor, comprising:

a plurality of types of application program execution units for generating an information display image according to various input information;

a linked information storage unit for storing said linked information to become said input information of one of said application program execution units;

a linked data storage unit for storing linked data that maps said anchor with said linked information;

a viewpoint manipulation unit for manipulating a viewpoint vector in a virtual three dimensional space constructed in a relevant apparatus;

a three dimensional space generator unit for generating a three dimensional image, which is an image in said virtual three dimensional space based on said viewpoint vector, rendering a three dimensional perspective;

a movement anchor generator unit for generating and specifying modification information for said viewpoint vector through said viewpoint manipulation unit as said anchor;

a retrieval unit for retrieving, based on said linked data, said linked information corresponding to specified said anchor, and supplying the retrieved information to said application program execution unit corresponding to the relevant linked information; and an image display unit for displaying said information display image, generated from said application program execution unit, on said three dimensional image.

* * * * *